United States Patent
Yamamuro et al.

(10) Patent No.: US 12,256,031 B2
(45) Date of Patent: Mar. 18, 2025

(54) DATA MANAGEMENT APPARATUS AND DATA MANAGEMENT METHOD

(71) Applicants: TOYOTA JIDOSHA KABUSHIKI KAISHA, Toyota (JP); SCALAR, INC., Tokyo (JP)

(72) Inventors: Naoki Yamamuro, Nagoya (JP); Wataru Fukatsu, Tokyo (JP)

(73) Assignees: TOYOTA JIDOSHA KABUSHIKI KAISHA, Toyota (JP); SCALAR, INC., Tokyo (JP)

( * ) Notice: Subject to any disclaimer, the term of this patent is extended or adjusted under 35 U.S.C. 154(b) by 204 days.

(21) Appl. No.: 17/973,051

(22) Filed: Oct. 25, 2022

(65) Prior Publication Data

US 2023/0115180 A1 Apr. 13, 2023

(30) Foreign Application Priority Data

Sep. 22, 2021 (JP) .................. 2021-154130

(51) Int. Cl.
*H04L 9/00* (2022.01)
*H04L 9/32* (2006.01)

(52) U.S. Cl.
CPC .............. *H04L 9/50* (2022.05); *H04L 9/3213* (2013.01); *H04L 9/3297* (2013.01)

(58) Field of Classification Search
CPC ....... H04L 9/50; H04L 9/3213; H04L 9/3297; H04L 9/3247
See application file for complete search history.

(56) References Cited

U.S. PATENT DOCUMENTS

| | | | |
|---|---|---|---|
| 10,282,558 B2 * | 5/2019 | Chan | G06F 21/64 |
| 2019/0180519 A1 * | 6/2019 | Hausman | G07B 15/063 |
| 2019/0279241 A1 * | 9/2019 | DiTomaso | G06F 16/27 |
| 2022/0123991 A1 | 4/2022 | Yamada | |

FOREIGN PATENT DOCUMENTS

| | | |
|---|---|---|
| EP | 3 832 510 A1 | 6/2021 |
| JP | 6694204 B1 | 5/2020 |
| WO | 2020/055413 A1 | 3/2020 |

OTHER PUBLICATIONS

Gipp, Bela et al.; "Decentralized Trusted Timestamping using the Crypto Currency Bitcoin"; Proceedings of the Conference 2015; Mar. 24-27, 2015; pp. 1-5.

\* cited by examiner

*Primary Examiner* — Sm A Rahman
(74) *Attorney, Agent, or Firm* — Oliff PLC

(57) ABSTRACT

When a controller of a client server updates component data D12 to component data D13, the controller creates in a distributed ledger which is a first proof chain, a record (Age [3]) including a hash value of the component data D13. Then, the controller generates a terminal hash value which is a hash value of a terminal record (Age [3]) in the first proof chain. The controller has the generated terminal hash value stored in a record in a distributed ledger which is a second proof chain, and associates the first proof chain and the second proof chain with each other.

7 Claims, 18 Drawing Sheets

FIG.2

| | | | DISTRIBUTED LEDGER SET 50 | | | | | | | | | | |
|---|---|---|---|---|---|---|---|---|---|---|---|---|---|
| DISTRIBUTED LEDGER 51 | | | | | | | DISTRIBUTED LEDGER 52 | | | | | | |
| Key | Age | Obj-HV | Nonce | Sig | Prev-HV | HV | Key | Age | Obj-HV | Nonce | Sig | Prev-HV | HV |
| k1 | 0 | ... | ... | ... | ... | H1 | k2 | 0 | ... | ... | ... | ... | Ha |
| k1 | 1 | ... | ... | ... | H1 | H2 | k2 | 1 | ... | ... | ... | Ha | Hb |
| k1 | 2 | ... | ... | ... | H2 | H3 | k2 | 2 | ... | ... | ... | Hb | Hc |

FIG.4

| Key | Age | Obj-HV | Nonce | Sig | Prev-HV | HV |
|---|---|---|---|---|---|---|
| k1 | 0 | ... | ... | ... | ... | H1 |
| k1 | 1 | ... | ... | ... | H1 | H2 |
| k1 | 2 | ... | ... | ... | H2 | H3 |
| k1 | 3 | ... | ... | ... | H3 | H4 |

DISTRIBUTED LEDGER 51

| Key | Age | Obj-HV | Nonce | Sig | Prev-HV | HV |
|---|---|---|---|---|---|---|
| k2 | 0 | ... | ... | ... | ... | Ha |
| k2 | 1 | ... | ... | ... | Ha | Hb |
| k2 | 2 | ... | ... | ... | Hb | Hc |
| k2 | 3 | ... | ... | ... | Hc,H4 | Hd |

DISTRIBUTED LEDGER 52

DISTRIBUTED LEDGER SET 50

FIG. 14

| Key | Age | Obj-HV | Nonce | Sig | Prev-HV | HV |
|---|---|---|---|---|---|---|
| k1 | 0 | ... | ... | ... | ... | H1 |
| k1 | 1 | ... | ... | ... | H1 | H2 |
| k1 | 2 | ... | ... | ... | H2 | H3 |

LEDGER 67

| Key | Age | Obj-HV | Nonce | Sig | Prev-HV | HV |
|---|---|---|---|---|---|---|
| k2 | 0 | ... | ... | ... | ... | Ha |
| k2 | 1 | ... | ... | ... | Ha | Hb |
| k2 | 2 | ... | ... | ... | Hb | Hc |

LEDGER 68

LEDGER SET 60

FIG.15

SUSPENSION TABLE

| Key | Nonce |
|-----|-------|
| k1  | ...   |

FIG.16

COMMIT TABLE 374

COMMIT DATA 375

| Key | Age | HV | Nonce |
|-----|-----|-----|-------|
| k1 | 0 | H1 | ... |
| k1 | 1 | H2 | ... |
| k1 | 2 | H3 | ... |

COMMIT DATA 376

| Key | Age | HV | Nonce |
|-----|-----|-----|-------|
| k2 | 0 | Ha | ... |
| k2 | 1 | Hb | ... |
| k2 | 2 | Hc | ... |

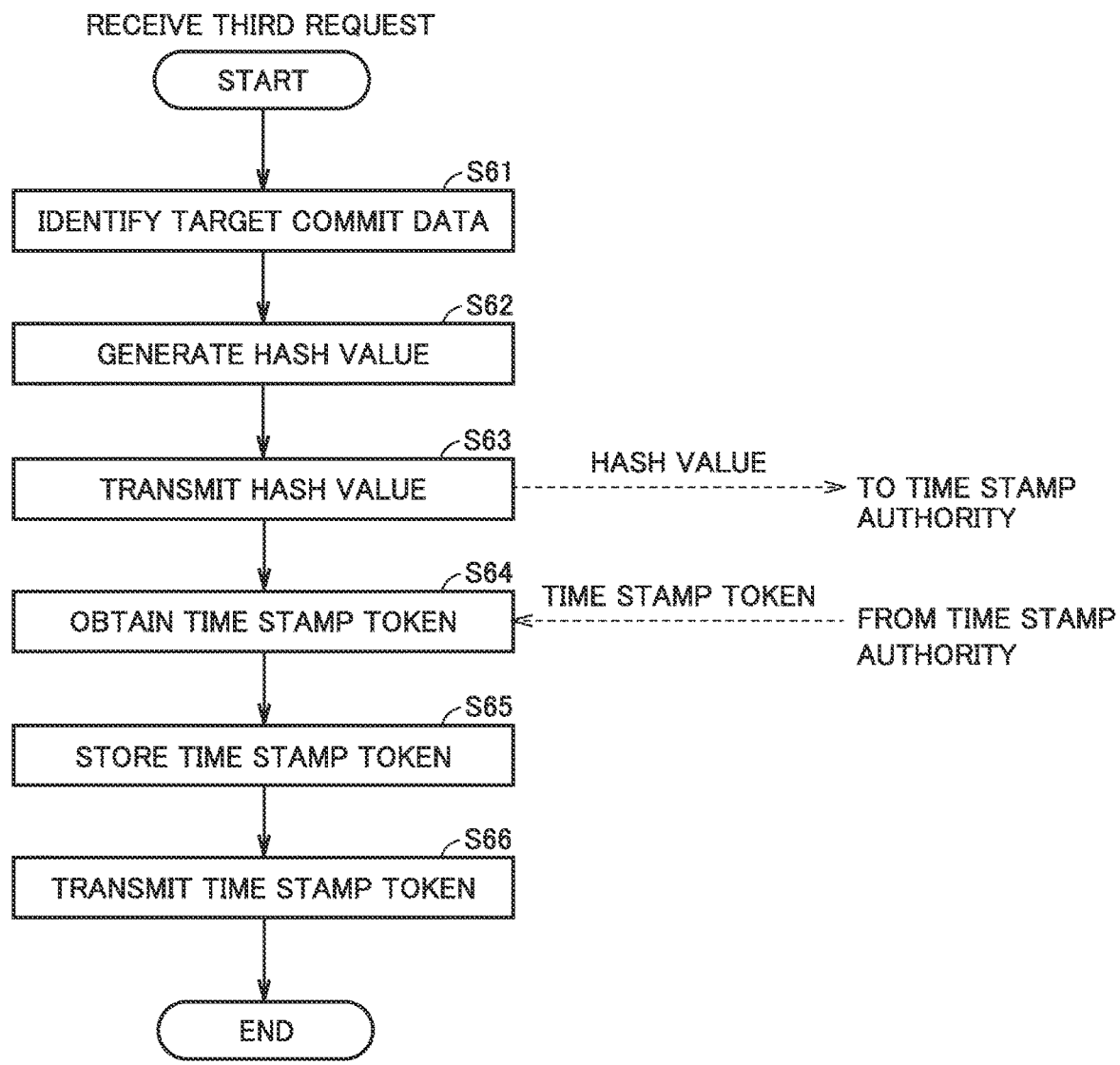

DATA MANAGEMENT APPARATUS AND DATA MANAGEMENT METHOD

BACKGROUND

Field

The present disclosure relates to a data management apparatus and a data management method for managing data based on a distributed ledger technology.

Description of the Background Art

Japanese Patent No. 6694204 discloses a data management system that manages information for each ID by configuring a distributed ledger (asset) having a directed acyclic graph (DAG) structure for each Key (ID) for identifying a management target.

In the data management system disclosed in Japanese Patent No. 6694204, for example, as data to be managed with a certain ID is updated, data is added to an asset prepared for that certain ID. For a target managed with another ID as well, as data to be managed with that another ID is updated, data is added to an asset prepared for that another ID.

Proof of ordering indicating which of the data stored in the asset prepared for the certain ID and the data stored in the asset prepared for another ID has existed earlier may be desired. Ordering may be proven, for example, by obtaining a time stamp token for a latest asset record each time each asset is updated. In this case, however, cost for obtaining the time stamp token may increase or load imposed on the system may increase.

SUMMARY

The present disclosure was made to solve problems above, and an object of the present disclosure is to facilitate proof of ordering of data between distributed ledgers in a system including a plurality of distributed ledgers.

(1) A data management apparatus according to one aspect of the present disclosure is a data management apparatus that manages data based on a distributed ledger technology. The data management apparatus includes a storage device where a distributed ledger is stored, in the distributed ledger, a record including information on the data being stored in a time-series manner, and a controller that adds the record to the distributed ledger. The data includes first data and second data. The distributed ledger includes a first distributed ledger where a record including first information on the first data is stored in a time-series manner and a second distributed ledger where a record including second information on the second data is stored in a time-series manner. When the first data is updated at a first time point, the controller causes the record including the first information to be stored in the first distributed ledger and generates a first terminal value including information on the record, and causes a record including the first terminal value to be stored in the second distributed ledger.

According to the configuration, at the first time point, the first terminal value is stored in the second distributed ledger. Thus, with the first time point being defined as the reference, the first distributed ledger and the second distributed ledger are associated with each other. Therefore, with the first time point being defined as the reference, ordering of existence of the first data updated at the first time point and the second data can be proven.

(2) In one embodiment, the first terminal value is a hash value of the record stored in the first distributed ledger at the first time point.

According to the configuration, since the hash value of the record in the first distributed ledger is stored in the record in the second distributed ledger, the first distributed ledger and the second distributed ledger can be associated with each other without excessive increase in data capacity.

(3) In one embodiment, the first information is a hash value of the first data. The second information is a hash value of the second data.

According to the configuration, since the records stored in the first distributed ledger and the second distributed ledger include the hash value of the first data and the hash value of the second data, the first data and the second data themselves can be concealed.

(4) In one embodiment, the controller causes the record including the first terminal value to be stored in the second distributed ledger based on a request from a user.

According to the configuration, the user can associate the first distributed ledger and the second distributed ledger with each other at any timing.

(5) In one embodiment, the data management apparatus further includes a communication apparatus configured to communicate with a time stamp authority. At a second time point which is a time point later than the first time point, the controller transmits a second terminal value including information on a record at a terminal in the second distributed ledger through the communication apparatus to the time stamp authority and obtains a time stamp token for the second terminal value from the time stamp authority through the communication apparatus.

According to the configuration, after the record including the first terminal value is stored in the second distributed ledger, the time stamp token for the second terminal value is obtained. Thus, while ordering of the first data and the second data with the first time point being defined as the reference can be proven, accuracy in time of the first data and the second data with the second time point being defined as the reference can be proven.

(6) In one embodiment, the controller obtains the time stamp token based on a request from a user.

According to the configuration, the user can obtain the time stamp token at any timing.

(7) A data management method according to another aspect of the present disclosure is a data management method by a data management apparatus that manages data based on a distributed ledger technology. The data management apparatus includes a storage device where a distributed ledger is stored, in the distributed ledger, a record including information on the data being stored in a time-series manner, and a controller that adds the record to the distributed ledger. The data includes first data and second data. The distributed ledger includes a first distributed ledger where a record including first information on the first data is stored in a time-series manner and a second distributed ledger where a record including second information on the second data is stored in a time-series manner. The data management method includes, when the first data is updated at a prescribed time point, under the control by the controller, storing the record including the first information in the first distributed ledger and generating a first terminal value including information on the record and storing a record including the first terminal value in the second distributed ledger.

The foregoing and other objects, features, aspects and advantages of the present disclosure will become more

BRIEF DESCRIPTION OF THE DRAWINGS

FIG. 2 is a diagram (No. 1) showing an exemplary configuration of a distributed ledger set.

FIG. 4 is a diagram (No. 2) showing an exemplary configuration of a distributed ledger set.

FIG. 14 is a diagram showing an exemplary configuration of a ledger set.

FIG. 15 is a diagram for illustrating an exemplary configuration of a suspension table.

FIG. 16 is a diagram for illustrating an exemplary configuration of a commit table.

FIG. 18 is a flowchart showing a procedure in processing for obtaining a time stamp token in the second embodiment.

DESCRIPTION OF THE PREFERRED EMBODIMENTS

Figure 1:
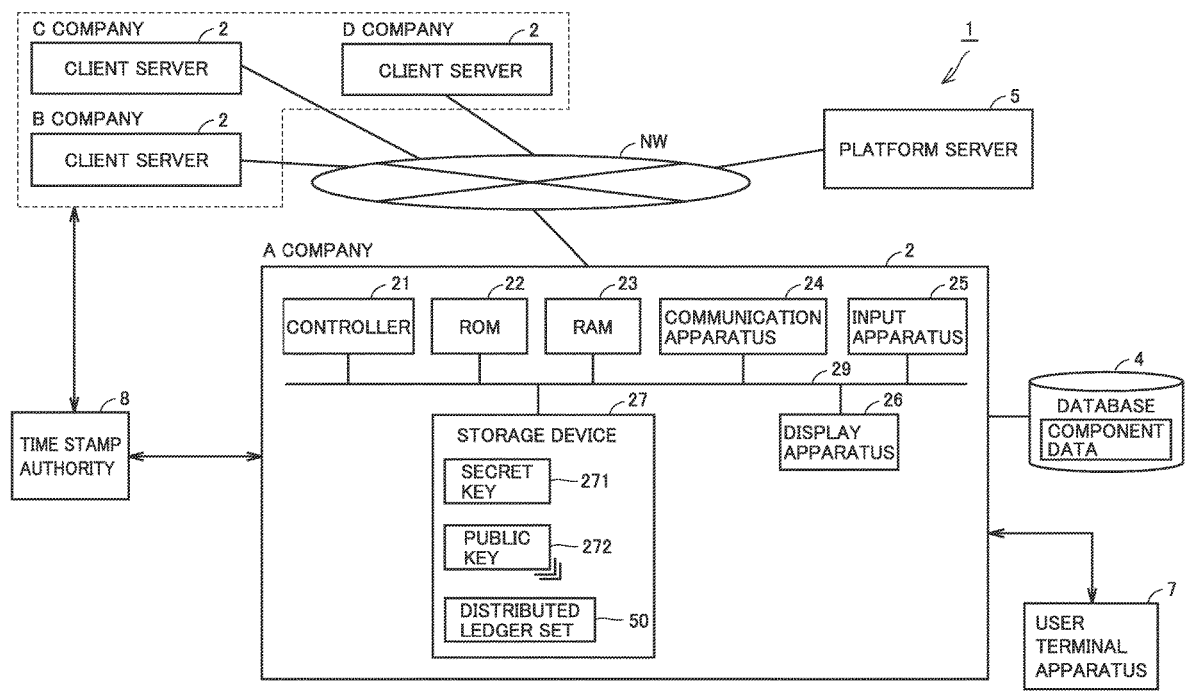
FIG. 1 is a diagram showing a schematic configuration of a data management system according to a first embodiment.

An embodiment of the present disclosure will be described in detail below with reference to the drawings. The same or corresponding elements in the drawings have the same reference characters allotted and description thereof will not be repeated.

First Embodiment

<Overall Configuration of Data Management System>

FIG. 1 is a diagram showing a schematic configuration of a data management system 1 according to a first embodiment. Data management system 1 according to the first embodiment is a system that forms a consortium network (which will also simply be referred to as a "network" below) NW among a plurality of companies and manages data based on a distributed ledger technology. Data management system 1 according to the first embodiment manages data on components (which will also simply be referred to as "component data" below) that compose a vehicle. The component data may be, for example, a specification of a component. Data managed by data management system 1 is not limited to data on components that compose a vehicle but various types of data may be applicable.

Referring to FIG. 1, data management system 1 includes four client servers 2, a platform server 5, and a time stamp authority (TSA) 8. Four client servers 2 belong to different companies (for example, an A company, a B company, a C company, and a D company).

Platform server 5 manages network NW. Platform server 5 accepts an application for participation in network NW from each client server 2. Platform server 5 permits participation of client server 2 into network NW based on an operation to permit participation performed by a manager of platform server 5 or based on a result of determination as to a prescribed condition. In the first embodiment, participation into network NW, of four client servers 2 belonging to the A company, the B company, the C company, and the D company, respectively, is permitted.

Four client servers 2 form network NW, and a hash value of component data is stored in a distributed ledger of each of them. Software based on the distributed ledger has been introduced in each of client servers 2, and as the introduced software based on the distributed ledger functions, each of client servers 2 functions as a node. Though client server 2 of the A company will representatively be described below, the client servers of the B company, the C company, and the D company are also similar in configuration and function. Client server 2 corresponds to an exemplary "data management apparatus" according to the present disclosure.

Client server 2 is configured to communicate with a user terminal apparatus 7. User terminal apparatus 7 is, for example, a desk-top personal computer (PC), a notebook PC, a tablet terminal, a smartphone, or another information processing terminal with a communication function lent to an employee of the A company.

A database 4 is connected to client server 2. Component data is stored in database 4. Component data is stored or updated in database 4 in accordance with a control signal from client server 2. For example, a user (for example, the employee of the A company) of client server 2 can request update of component data by performing an operation onto an input apparatus 25 (which will be described later) of client server 2 or by performing an operation onto user terminal apparatus 7. Client server 2 (a controller 21) generates a control signal for storing/updating component data in response to an input to input apparatus 25 or a request from user terminal apparatus 7 and outputs the control signal to database 4.

As client server 2 has component data stored in database 4/updates component data in database 4, it generates a hash value of the component data and generates transaction data for storing the hash value in the distributed ledger. Then, client server 2 transmits the generated transaction data to another client server 2 that forms network NW, that is, client servers 2 of the B company, the C company, and the D company. In the distributed ledger, a hash value of the component data is stored in a time-series manner, and the distributed ledger forms a proof chain for proving existence of the component data. Though an example where four client servers are included in network NW in data management system 1 according to the first embodiment is described, any number of client servers 2 such as less than four client servers or five or more client servers may be included in network NW.

Time stamp authority 8 includes a server belonging to an authentication organization that issues a time stamp token. The time stamp authority issues a time stamp token in response to a time stamp issuance request from an applicant (client server 2 in the first embodiment) More specifically, the time stamp authority transmits to the applicant, a time stamp token in which data (a record hash value which will be described later in the first embodiment) received from the applicant is linked to time information based on a time source with followability to international standard time.

Client server 2 includes controller 21, a read only memory (ROM) 22, a random access memory (RAM) 23, a communication apparatus 24, an input apparatus 25, a display apparatus 26, and storage device 27. Controller 21, ROM 22, RAM 23, communication apparatus 24, input apparatus 25, display apparatus 26, and storage device 27 are connected to a bus 29.

Controller 21 is implemented, for example, by an integrated circuit including a central processing unit (CPU). Controller 21 develops various programs stored in ROM 22 on RAM 23 and executes the programs. The various programs include an operating system and the like. RAM 23 functions as a working memory, and various types of data necessary for execution of various programs are temporarily stored therein. Though detailed description will be given later, controller 21 performs functions to update component data recorded in database 4, to generate transaction data for updating a distributed ledger, and to obtain a time stamp token.

Communication apparatus 24 is configured to communicate with external equipment. The external equipment includes, for example, another client server 2, user terminal apparatus 7, time stamp authority 8, and the like. Communication between communication apparatus 24 and the external equipment is established over the Internet, a wide area network (WAN), a local area network (LAN), an Ethernet® network, a public network, a private network, a wired network or a wireless network, or the like, or combination thereof.

Input apparatus 25 includes an input device. The input device is implemented, for example, by a mouse, a keyboard, a touch panel, and/or another apparatus capable of accepting an operation by a user.

Display apparatus 26 includes a display. Display apparatus 26 has a display show various images in accordance with a control signal from controller 21. The display is implemented, for example, by a liquid crystal display, an organic electro luminescence (EL) display, or other display equipment.

Storage device 27 includes, for example, a storage medium such as a hard disk or a flash memory. A secret key 271, a plurality of public keys 272, and a distributed ledger set 50 are stored in storage device 27.

Secret key 271 is a secret key of the A company. For example, in participation of client server 2 into network NW for the first time, controller 21 generates a secret key and a public key. Then, controller 21 transmits the generated public key to an authentication bureau (not shown) to have the public key authenticated. The authentication bureau is an authentication organization that issues an electronic certificate. The authentication bureau issues an electronic certificate including information on the public key. Controller 21 has secret key 271 corresponding to the authenticated public key stored in storage device 27. Controller 21 transmits authenticated public key (electronic certificate) 272 to client servers 2 of the B company, the C company, and the D company.

The plurality of public keys 272 include the public key of the B company, the public key of the C company, and the public key of the D company. Controller 21 has the public keys received from other client servers 2 stored in storage device 27. The public key of the A company itself may be stored in storage device 27.

Distributed ledger set 50 includes a plurality of distributed ledgers. The distributed ledger is prepared for each component that composes the vehicle. FIG. 2 is a diagram showing an exemplary configuration of distributed ledger set 50. In the first embodiment, an example in which two components (a first component and a second component) that compose the vehicle are managed by data management system 1 will be described. Specifically, distributed ledger set 50 includes a distributed ledger 51 serving as a proof chain of component data of the first component, where a state of update of the component data of the first component is stored in a time-series manner, and a distributed ledger 52 serving as a proof chain of component data on the second component, where a state of update of the component data of the second component is stored in a time-series manner. When there are N (which is a natural number equal to or larger than two) components that compose the vehicle, distributed ledger set 50 includes N distributed ledgers. A component the data of which is managed with the use of the distributed ledger will also be referred to as a "target component" below. In other words, the target component in the first embodiment is the first component and the second component.

A record including a hash value of the component data of the first component is stored in a time-series manner in distributed ledger 51. The record includes such information as "Key", "Age", "Obj-HV", "Nonce", "Sig", "Prev-HV", and "HV".

Key represents information indicating an ID of the target component (first component). An ID k1 is allocated to the first component.

Age represents information indicating a generation of a record. In the first record of the first component stored in distributed ledger 51, Age is set to Age 0. As the first component is updated and a record is added, Age is incremented.

Obj-HV represents a hash value of the component data of the first component. For example, as the component data of the first component registered in database 4 is updated, the hash value of the updated component data is generated and defined as Obj-HV. The hash value is a numeric value obtained as a result of hashing of the component data with a hash function.

Nonce represents a nonce value indicating a number of transaction data. Specifically, the nonce value is generated by client server 2 (controller 21), for example, at the time of update of the component data of the first component stored in database 4, as a number of processing for storing a hash value of the updated component data in distributed ledger 51. The nonce value refers to a hash value that is less likely to cryptographically cause collision.

Sig represents an electronic signature created with secret key 271 of client server 2 that has issued transaction data. The electronic signature is created, for example, by encryption of Obj-IV (that is, the hash value of the component data of the first component) with secret key 271. Alternatively, the electronic signature may be created, for example, by encryption of Nonce (nonce value) with secret key 271.

Prev-HV represents a hash value of a record (a parent record) in a generation immediately preceding the latest (terminal) record. In other words, Prev-HV represents HV of the parent record.

HV represents a hash value of the latest (terminal) record. Specifically, HV represents a hash value (which will also be referred to as a "record hash value" below) of information (Key, Age. Obj-HV, Nonce, Sig, and Prev-HV) on a record except for HV.

For example, as shown in FIG. 2, with attention being paid to the latest (terminal) record (a record of Age "2") in distributed ledger 51, Prev-HV of the terminal record is set to "H2" which is HV of the parent record (Age "1"). Then, when the component data of the first component is updated and a record of Age "3" is added, Prev-HV of the record of Age "3" is set to "H3" which is HV of the record of Age "2". The terminal record thus has such a structure as including a record hash value of the parent record. In other words, a chain of records is realized between Prev-HV of the terminal record and HV of the parent record. Distributed ledger 51 is thus in a DAG structure.

A record including a hash value of the component data of the second component is stored in a time-series manner in distributed ledger 52. The record includes such information as "Key", "Age", "Obj-HV", "Nonce", "Sig", "Prev-HV", and "HV". Since details thereof are similar to those of the record in distributed ledger 51, description will not be repeated.

As client server 2 (controller 21) receives an operation to update the component data, for example, through input apparatus 25 or user terminal apparatus 7, it updates the component data stored in database 4. Then, client server 2 (controller 21) generates transaction data for adding the record including the hash value of the updated component data to distributed ledger set 50 (distributed ledger 51 or distributed ledger 52). This transaction data includes such information as "Key", "Age", "Obj-HV", "Nonce", "Sig", "Prev-HV", and "HV".

The transaction data may further include time information on time at which transaction data is broadcast toward network NW (transmitted to network NW) and sender information on a sender of the transaction data. The time information may be, for example, information indicating time at which component data of the target component is recorded in database 4. The sender information is, for example, information indicating the A company. The sender information of the transaction data may be further specific, and it may be information indicating a department (one department of the A company) that has performed an operation to transmit transaction data to network NW or information indicating an individual (an employee of the A company) who has performed the operation to transmit transaction data to network NW.

<Proof of Ordering>

Proof as to which of the component data of the first component and the component data of the second component has existed earlier may be desired. In other words, proof of ordering of the component data of the first component and the component data of the second component may be desired. A technique to prove ordering may include, for example, proving time of addition of a record by obtaining, each time a record is added to each of distributed ledgers 51 and 52, a time stamp token for a record hash value of the added record (terminal record) and proving ordering of two pieces of data. With this technique, however, the time stamp token should be obtained each time a record is added to distributed ledger 51 or 52, and man-hours and cost will increase. Processing load imposed on data management system 1 will also increase.

Then, in data management system 1 according to the first embodiment, incorporation of a record hash value in one distributed ledger (for example, distributed ledger 51) into a record in the other distributed ledger (for example, distributed ledger 52) is enabled. Two distributed ledgers 51 and 52 are thus associated with each other.

Figure 3:
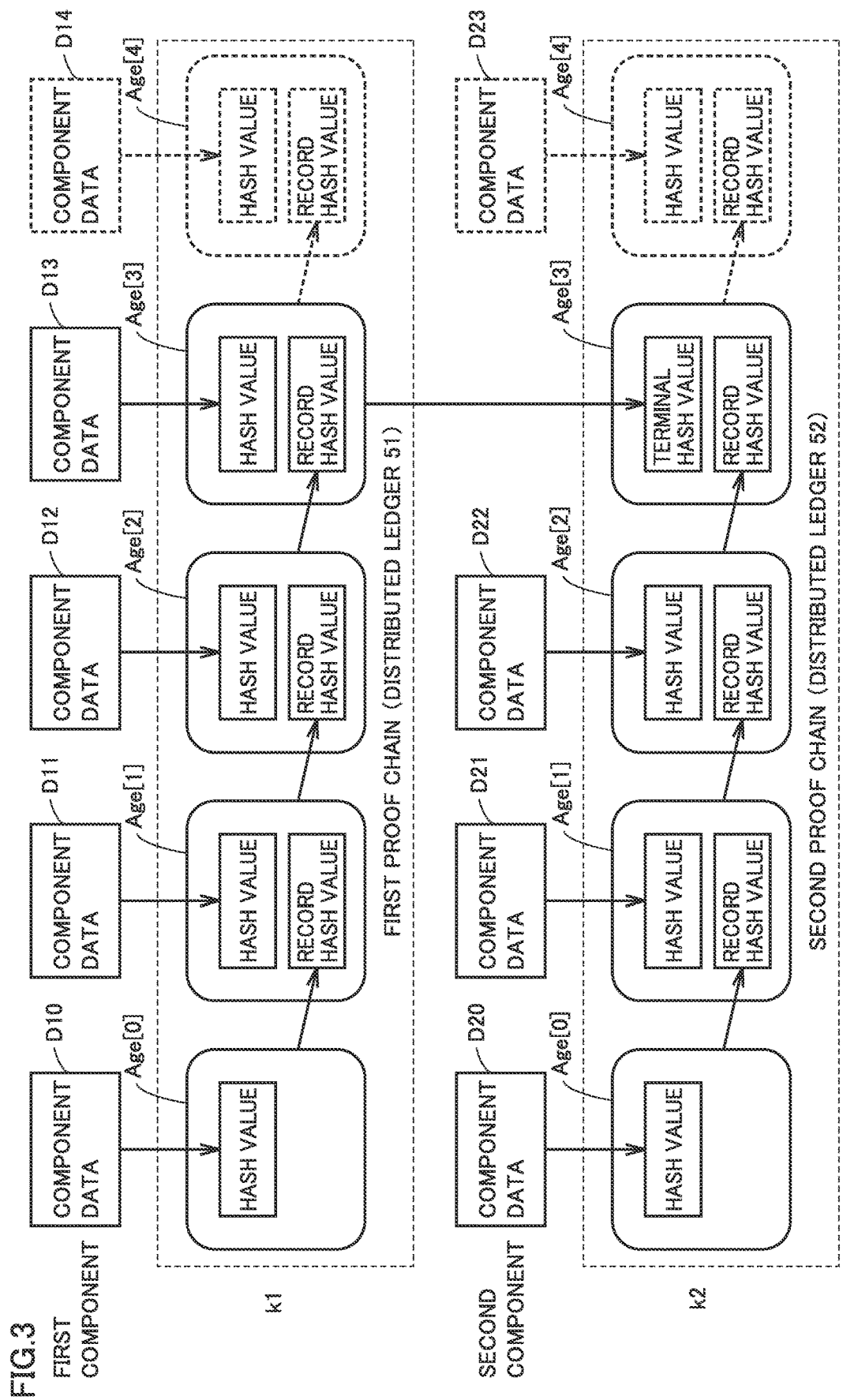
FIG. 3 is a diagram for illustrating association between two distributed ledgers.

FIG. 3 is a diagram for illustrating association between two distributed ledgers 51 and 52. An upper tier in FIG. 3 schematically shows distributed ledger 51 which is the proof chain of the first component and a lower tier in FIG. 3 schematically shows distributed ledger 52 which is the proof chain of the second component. The proof chain of the first component will also be referred to as a "first proof chain" below and the proof chain of the second component will also be referred to as a "second proof chain" below.

The hash value of the component data of the first component is stored in a time-series manner in the first proof chain (distributed ledger 51). As the component data of the first component is first registered in database 4, a record (Age "0") including the hash value of that component data is stored in distributed ledger 51. Then, as the component data of the first component is updated and the updated component data is registered in database 4, a record (Age "1") including the hash value of the updated component data and the record hash value of the parent record (Age "0") is stored in distributed ledger 51. As the component data of the first component is further updated and the updated component data is registered in database 4, a record (Age "2") including the hash value of the updated component data and the record hash value of the parent record (Age "1") is stored in distributed ledger 51.

The hash value of the component data of the second component is stored in a time-series manner in the second proof chain (distributed ledger 52) As the component data of the second component is first registered in database 4, a record (Age "0") including the hash value of that component data is stored in distributed ledger 52. Then, as the component data of the second component is updated and the updated component data is registered in database 4, a record (Age "1") including the hash value of the updated component data and the record hash value of the parent record (Age "0") is stored in distributed ledger 52. As the component data of the second component is further updated and the updated component data is registered in database 4, a record (Age "2") including the hash value of the updated component data and the record hash value of the parent record (Age "1") is stored in distributed ledger 52.

It is assumed here that the record of Age "2" is the latest (terminal) record in each of distributed ledger 51 and distributed ledger 52 as above. Then, it is assumed that a first operation to update the component data of the first component is performed on input apparatus 25 or user terminal apparatus 7 in this state. Furthermore, it is assumed that, in addition to the first operation, a second operation to associate the first proof chain with the second proof chain is performed on input apparatus 25 or user terminal apparatus 7. The operation to update the component data (first operation) may be, for example, an operation to input an ID (Key) of a target component and to select an update button shown on a display screen of display apparatus 26 or user terminal apparatus 7. The operation to associate the proof chains with each other (second operation) may be an operation to input IDs (Keys) of two target components and to select a shown association button. On the display screen for the second operation, for example, a "creation target input field" for input of an ID (Key) of a target component for which the record hash value is to be created and an "incorporation target input field" for input of an ID (Key) of a target component into which the record hash value is to be incorporated are provided. For example, by inputting k1 into the creation target input field and inputting k2 into the incorporation target input field, the record hash value in the first proof chain (distributed ledger 51) is incorporated into the record in the second proof chain (distributed ledger 52). It is assumed here that k1 has been inputted into the creation target input field and k2 has been inputted into the incorporation target input field. The display screen for the first operation and the display screen for the second operation may simultaneously be shown in the same screen.

Referring to FIGS. 2 and 3, as two operations of the first operation and the second operation are performed, controller 21 initially updates component data D12 of the first component stored in database 4 to component data D13 in response to the first operation. When component data D10 of the first component is first stored in database 4, controller 21 should only have component data of the first component newly stored in database 4. Controller 21 creates a record (Age "3") including the hash value of component data D13 and the record hash value of the parent record (Age "2") and has the record stored in distributed ledger 51. Controller 21 generates transaction data for adding the record of Age "3" to distributed ledger 51. Controller 21 transmits the generated transaction data to client servers 2 of the B company, the C company, and the D company through communication apparatus 24. As transaction processing for executing the transaction data is performed in each client server 2, the record of Age "3" is stored in distributed ledger 51 of each client server 2.

Then, in response to the second operation, controller 21 generates the hash value of the terminal record (Age "3") in distributed ledger 51 as a "terminal hash value." The terminal hash value is the record hash value of the terminal record (Age "3") Controller 21 creates a record (Age "3") including the generated terminal hash value and the record hash value of the parent record (Age "2") in distributed ledger 52 and has the record stored in distributed ledger 52. As the terminal hash value in distributed ledger 51 is incorporated into the record (Age "3") in distributed ledger 52, distributed ledger 51 and distributed ledger 52 are associated with each other. Controller 21 generates transaction data for adding the record of Age "3" to distributed ledger 52. Controller 21 transmits the generated transaction data to client servers 2 of the B company, the C company, and the D company through communication apparatus 24. As transaction processing for executing the transaction data is performed in each client server 2, distributed ledgers 51 and 52 are associated with each other in distributed ledger set 50 in each client server 2.

An exemplary specific structure of distributed ledger 52 is as shown in FIG. 4. FIG. 4 is a diagram showing an exemplary configuration of distributed ledger set 50. The record of Age "3" in distributed ledger 52 includes a hash value He and a hash value H4 as Prev-HV. Hash value He is the record hash value of the parent record (Age "2") and hash value H4 is the record hash value (terminal hash value) of the record (Age "3") in distributed ledger 51.

As set forth above, as the terminal hash value in distributed ledger 51 is incorporated into Prev-HV of the record in distributed ledger 52, distributed ledger 51 and distributed ledger 52 are associated with each other (the first proof chain and the second proof chain are associated with each other). Ordering of the component data of the first component and the component data of the second component can thus be proven. Referring to FIG. 3, for example, component data D13 of the first component can be proven to have been registered in database 4 after component data D22 of the second component was registered in database 4 and before component data D23 of the second component is registered in database 4.

Furthermore, by obtaining the time stamp token for the record hash value of Age "3" in distributed ledger 52, existence of component data D10 to D13 of the first component at the time proven by the time stamp token and existence of component data D20 to D22 of the second component can be proven Man-hours, cost, and load imposed on the system can be less than in an example where the time stamp token is obtained for each record in distributed ledgers 51 and 52. In other words, by obtaining the time stamp token for the record hash value of the record of Age "3" in distributed ledger 52 into which the terminal hash value in distributed ledger 51 has been incorporated, ordering and accuracy in time of existence of the component data of the first component and the component data of the second component can be ensured.

When component data of the first component is further updated from D13 to D14, a record (Age "4") including a hash value of component data D14 and a record hash value of Age "3" in distributed ledger 51 is added to distributed ledger 51. Similarly, when component data of the second component is further updated from D22 to D23, a record (Age "4") including a hash value of component data D23 and a record hash value of Age "3" in distributed ledger 52 is added to distributed ledger 52.

<Functional Block>

Figure 5:
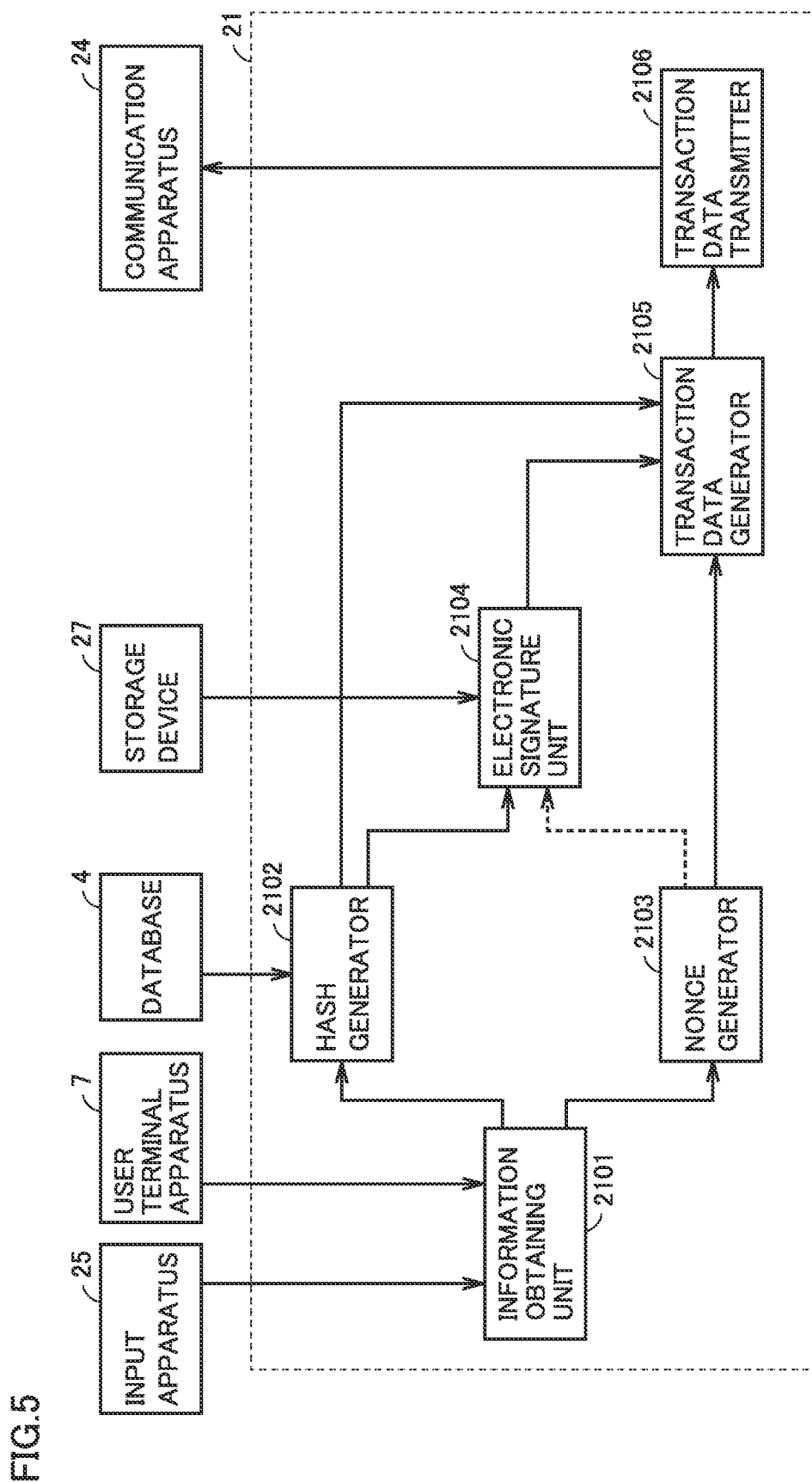
FIG. 5 is a functional block diagram of a controller for performing processing for responding to a first operation.

FIG. 5 is a functional block diagram of controller 21 for performing processing for responding to the first operation. Referring to FIG. 5, controller 21 includes an information obtaining unit 2101, a hash generator 2102, a nonce generator 2103, an electronic signature unit 2104, a transaction data generator 2105, and a transaction data transmitter 2106. Controller 21 functions as information obtaining unit 2101, hash generator 2102, nonce generator 2103, electronic signature unit 2104, transaction data generator 2105, and transaction data transmitter 2106, for example, by executing a program stored in ROM 22. Information obtaining unit 2101, hash generator 2102, nonce generator 2103, electronic signature unit 2104, transaction data generator 2105, and transaction data transmitter 2106 may be implemented, for example, by dedicated hardware (electronic circuitry).

As the first operation to update the component data of the first component is performed on input apparatus 25 or user terminal apparatus 7, input apparatus 25 or user terminal apparatus 7 outputs a first request indicating that the first operation has been performed.

Information obtaining unit 2101 obtains the first request from input apparatus 25 or user terminal apparatus 7. For example, when a user of client server 2 operates input apparatus 25 to have the component data of the target component stored (registered/updated) in database 4, the first request is inputted to information obtaining unit 2101. The first request includes an ID (Key) for identifying a target component. As information obtaining unit 2101 obtains the first request, it outputs the first request to hash generator 2102 and nonce generator 2103.

As hash generator 2102 receives the first request, for example, it reads the component data of the target component from database 4 and generates the hash value of the component data. Hash generator 2102 outputs the generated hash value and the ID of the target component to electronic signature unit 2104 and transaction data generator 2105.

As nonce generator 2103 receives the first request, it generates a nonce value. The nonce value refers to a hash value that is less likely to cryptographically cause collision. Nonce generator 2103 outputs the generated nonce value and the ID of the target component to transaction data generator 2105. When the nonce value is used for creation of the electronic signature, nonce generator 2103 may output the nonce value and the ID of the target component to electronic signature unit 2104.

Electronic signature unit 2104 reads secret key 271 from storage device 27. Electronic signature unit 2104 creates the electronic signature by encrypting with secret key 271, the hash value received from hash generator 2102. Electronic signature unit 2104 outputs the created electronic signature and the ID of the target component to transaction data generator 2105. Alternatively, electronic signature unit 2104 may create the electronic signature by encrypting with secret key 271, the nonce value received from nonce generator 2103. Alternatively, electronic signature unit 2104 may create the electronic signature by encrypting the hash value and the nonce value with secret key 271.

Transaction data generator 2105 generates transaction data to be transmitted to network NW. For example, transaction data generator 2105 generates transaction data including such information as Key, Age, Obj-HV, Nonce, Sig, Prev-HV, and HV. Transaction data generator 2105 recognizes Age of the parent record, for example, by checking Key against distributed ledger set 50, increments Age of the parent record, and sets incremented Age as Age of the record to be added. Transaction data generator 2105 sets the hash value generated by hash generator 2102 as Obj-HV, sets the nonce value generated by nonce generator 2103 as Nonce, and sets the electronic signature created by electronic signature unit 2104 as Sig. Transaction data generator 2105 sets the record hash value of the parent record as Prev-HV. Transaction data generator 2105 hashes such information as Key, Age, Obj-HV, Nonce, Sig, and Prev-HV, and sets the information as HV. The transaction data may further include time information on time at which the transaction data is broadcast toward network NW (transmitted to network NW) and sender information on a sender of the transaction data. Transaction data generator 2105 outputs the generated transaction data to transaction data transmitter 2106.

Transaction data transmitter 2106 outputs to communication apparatus 24, a control signal for transmitting transaction data to network NW. The transaction data is thus transmitted to network NW through communication apparatus 24.

Figure 6:
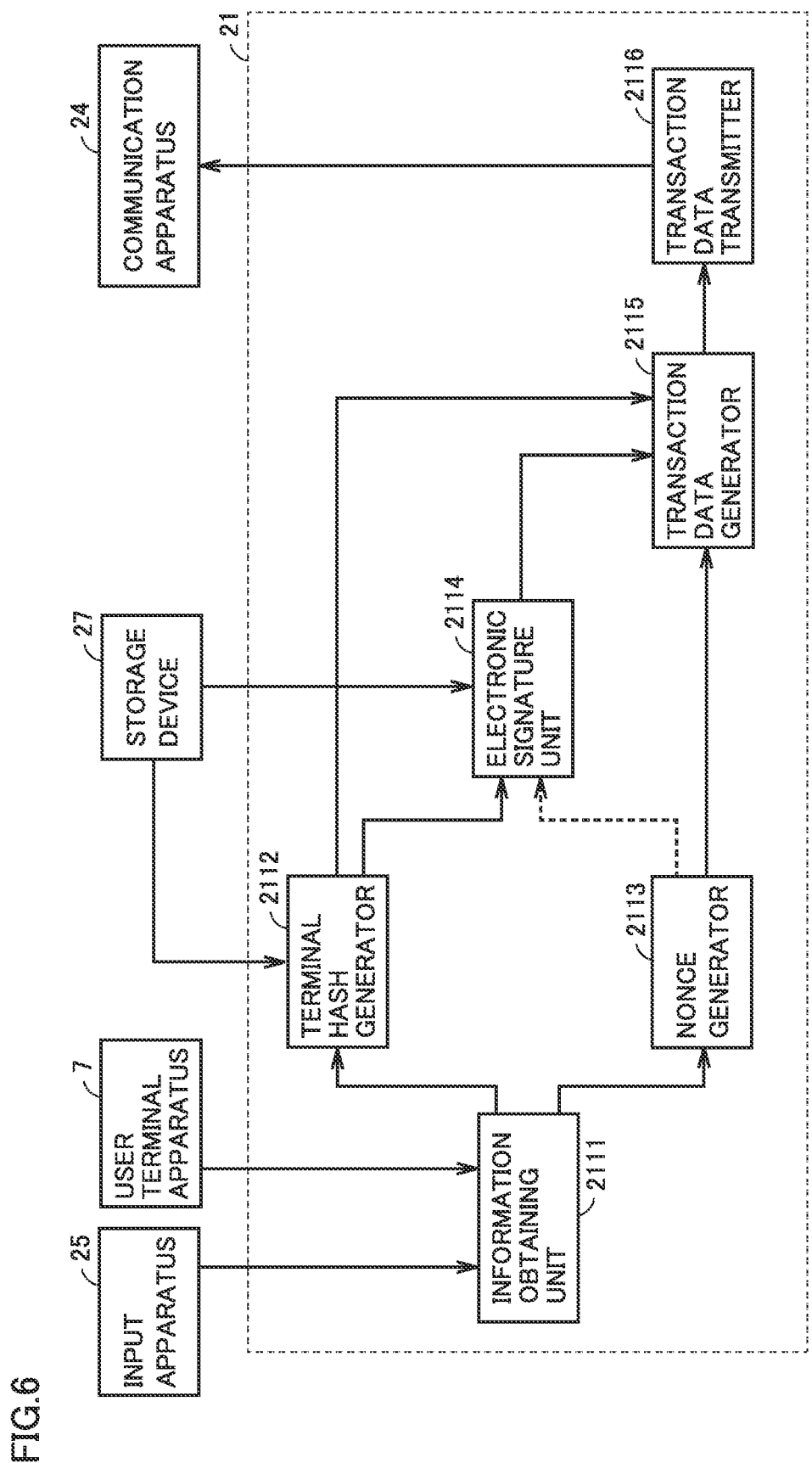
FIG. 6 is a functional block diagram of the controller for performing processing for responding to a second operation.

FIG. 6 is a functional block diagram of controller 21 for performing processing for responding to the second operation. Referring to FIG. 6, controller 21 includes an information obtaining unit 2111, a terminal hash generator 2112, a nonce generator 2113, an electronic signature unit 2114, a transaction data generator 2115, and a transaction data transmitter 2116. Controller 21 functions as information obtaining unit 2111, terminal hash generator 2112, nonce generator 2113, electronic signature unit 2114, transaction data generator 2115, and transaction data transmitter 2116, for example, by executing a program stored in ROM 22. Information obtaining unit 2111, terminal hash generator 2112, nonce generator 2113, electronic signature unit 2114, transaction data generator 2115, and transaction data transmitter 2116 may be implemented, for example, by dedicated hardware (electronic circuitry).

As the second operation to associate the first proof chain (distributed ledger 51) and the second proof chain (distributed ledger 52) with each other is performed on input apparatus 25 or user terminal apparatus 7, input apparatus 25 or user terminal apparatus 7 outputs a second request indicating that the second operation has been performed.

Information obtaining unit 2111 obtains the second request from input apparatus 25 or user terminal apparatus 7. For example, as the user of client server 2 operates input apparatus 25 to select an association button for associating the proof chains with each other (performs the second operation) in addition to the first operation, the second request is inputted to information obtaining unit 2111. The second request includes an ID (for example, k1) of a target component for which the terminal hash value is to be created and an ID (for example, k2) of a target component into which the terminal hash value is to be incorporated. As information obtaining unit 2111 obtains the second request, it outputs the second request to terminal hash generator 2112 and nonce generator 2113.

Terminal hash generator 2112 generates as the terminal hash value, the hash value of the latest record (the record at the terminal in the proof chain) in the distributed ledger (for example, distributed ledger 51) identified by the ID of the target component for which the terminal hash value is to be created. Terminal hash generator 2112 outputs the generated terminal hash value and the ID (for example, k2) of the target component into which the terminal hash value is to be incorporated to electronic signature unit 2114 and transaction data generator 2115.

As nonce generator 2113 receives the second request, it generates the nonce value Nonce generator 2113 outputs to transaction data generator 2115, the generated nonce value and the ID (for example, k2) of the target component into which the terminal hash value is to be incorporated. When the nonce value is used for creation of the electronic signature, nonce generator 2113 may output the nonce value and the ID (for example, k2) of the target component into which the terminal hash value is to be incorporated to electronic signature unit 2114.

Electronic signature unit 2114 reads secret key 271 from storage device 27. Electronic signature unit 2114 creates the electronic signature by encrypting the terminal hash value received from terminal hash generator 2112 with secret key 271. Electronic signature unit 2114 outputs to transaction data generator 2115, the created electronic signature and the ID (for example, k2) of the target component into which the terminal hash value is to be incorporated. Alternatively, electronic signature unit 2114 may create the electronic signature by encrypting the nonce value received from nonce generator 2113 with secret key 271. Alternatively, electronic signature unit 2114 may create the electronic signature by encrypting the terminal hash value and the nonce value with secret key 271.

Transaction data generator 2115 generates transaction data to be transmitted to network NW. For example, transaction data generator 2115 generates transaction data including such information as Key, Age, Obj-HV, Nonce, Sig, Prev-HV, and HV. Transaction data generator 2115 sets the ID (for example, k2) of the target component into which the terminal hash value is to be incorporated as Key. Transaction data generator 2115 sets the terminal hash value generated by terminal hash generator 2112 as Obj-HV. Other functions of transaction data generator 2115 are basically similar to those of transaction data generator 2105 described with reference to FIG. 5.

Transaction data transmitter 2116 outputs to communication apparatus 24, a control signal for transmitting transaction data to network NW. The transaction data is thus transmitted to network NW through communication apparatus 24.

Figure 7:
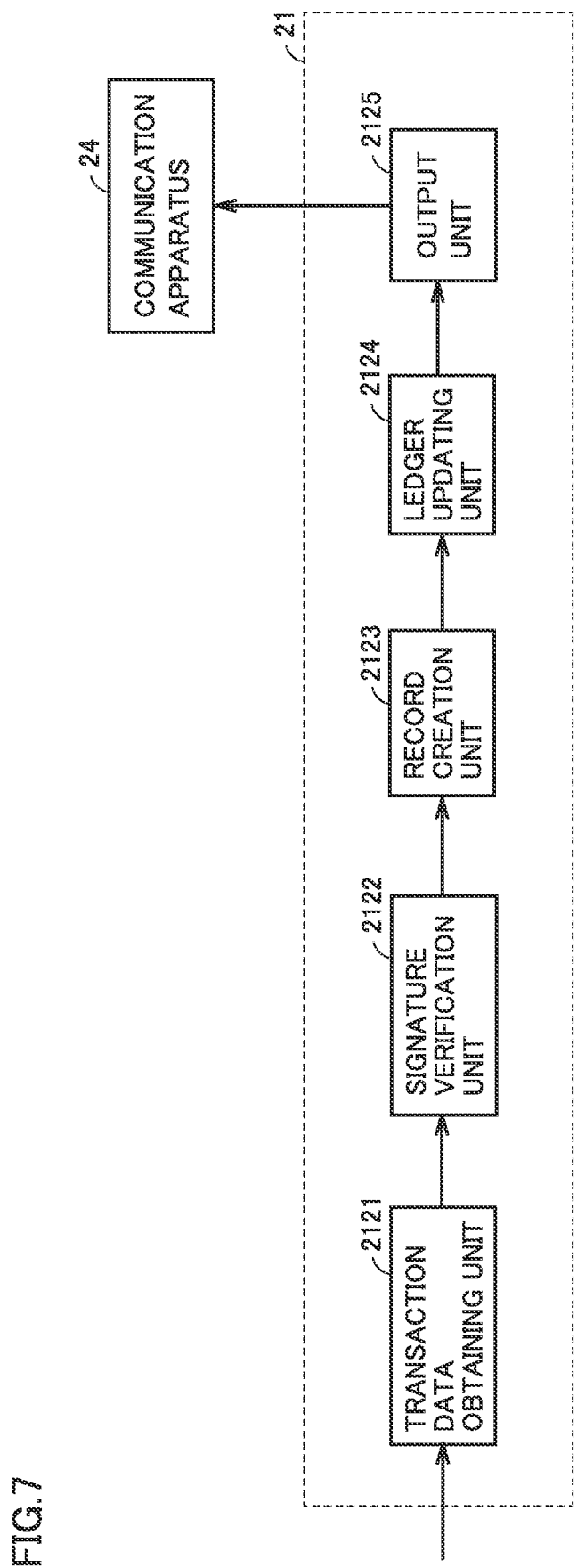
FIG. 7 is a functional block diagram of the controller for executing received transaction data.

FIG. 7 is a functional block diagram of controller 21 for executing received transaction data. Referring to FIG. 7, controller 21 includes a transaction data obtaining unit 2121, a signature verification unit 2122, a record creation unit 2123, a ledger updating unit 2124, and an output unit 2125. Controller 21 functions as transaction data obtaining unit 2121, signature verification unit 2122, record creation unit 2123, ledger updating unit 2124, and output unit 2125, for example, by executing a program stored in ROM 22. Transaction data obtaining unit 2121, signature verification unit 2122, record creation unit 2123, ledger updating unit 2124, and output unit 2125 may be implemented, for example, by dedicated hardware (electronic circuitry).

Transaction data obtaining unit 2121 obtains transaction data transmitted from another client server 2. Transaction data obtaining unit 2121 outputs the obtained transaction data to signature verification unit 2122.

Signature verification unit 2122 verifies validity of the electronic signature (Sig) included in the transaction data. Initially, signature verification unit 2122 identifies client server 2 which is the sender of the transaction data based on sender information included in the transaction data. Then, signature verification unit 2122 reads a public key (one of a plurality of public keys 272) of identified client server 2 from storage device 27. Signature verification unit 2122 decrypts the electronic signature included in the transaction data with the read public key. As described above, the electronic signature is created by encryption of the hash value or the terminal hash value of the component data with the secret key of sender client server 2. Signature verification unit 2122 compares the decrypted value with Obj-HV (the hash value or the terminal hash value) included in the transaction data. When signature verification unit 2122 confirms match therebetween, it acknowledges validity of the electronic signature.

When validity of the electronic signature is acknowledged, record creation unit 2123 creates a record to be added to distributed ledger set 50 based on the transaction data. Record creation unit 2123 reads such information as Key, Age, Obj-HV, Nonce, Sig, Prev-HV, and HV from the transaction data and creates a record including such information.

Ledger updating unit 2124 adds the record created by record creation unit 2123 to distributed ledger set 50 to update distributed ledger set 50. Specifically, ledger updating unit 2124 refers to Key in the created record and identifies a distributed ledger to which the record is to be added. For example, transaction data generated in accordance with the first operation to update the component data of the first component described above includes as Key, "k1" indicating the ID of the first component. The record created based on this transaction data also includes "k1" as Key. Therefore, ledger updating unit 2124 adds the record to distributed ledger 51 which is the proof chain of the component data of the first component. The transaction data generated in accordance with the second operation to associate the first proof chain with the second proof chain described above includes as Key, "k2" indicating the ID of the second component. The record created based on this transaction data also includes "k2" as Key. Therefore, ledger updating unit 2124 adds the record to distributed ledger 52 which is the proof chain of the component data of the second component.

As update of distributed ledger set 50 is completed, ledger updating unit 2124 outputs that fact to output unit 2125.

Output unit 2125 outputs to communication apparatus 24, a control signal for transmission of an indication of completion of processing for executing transaction data (transaction processing) to client server 2 which is the sender of the transaction data. A report on completion of transaction processing is thus transmitted through communication apparatus 24 to client server 2 which is the sender of the transaction data.

Figure 8:
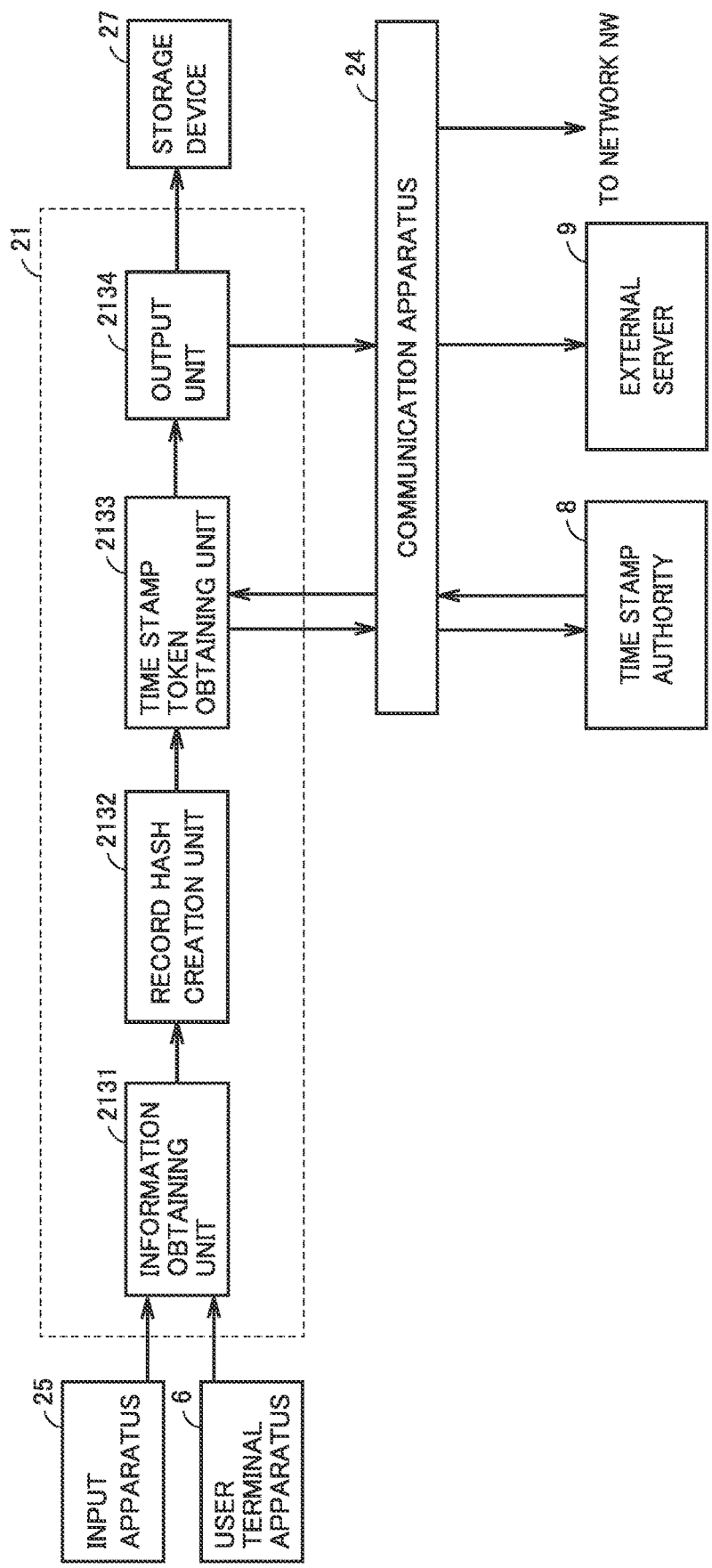
FIG. 8 is a functional block diagram of the controller for obtaining a time stamp token.

FIG. 8 is a functional block diagram of controller 21 for obtaining a time stamp token. Referring to FIG. 8, controller 21 includes an information obtaining unit 2131, a record hash creation unit 2132, a time stamp token obtaining unit 2133, and an output unit 2134. Controller 21 functions as information obtaining unit 2131, record hash creation unit 2132, time stamp token obtaining unit 2133, and output unit 2134, for example, by executing a program stored in ROM 22. Information obtaining unit 2131, record hash creation unit 2132, time stamp token obtaining unit 2133, and output unit 2134 may be implemented, for example, by dedicated hardware (electronic circuitry).

As a third operation to request obtainment of a time stamp token is performed on input apparatus 25 or user terminal apparatus 7, input apparatus 25 or user terminal apparatus 7 outputs a third request indicating that the third operation has been performed.

Information obtaining unit 2131 obtains the third request from input apparatus 25 or user terminal apparatus 7. For example, as the user of client server 2 operates input apparatus 25 to input an ID of a target for which a time stamp token is to be obtained on the display screen of display apparatus 26 and to select a time stamp token obtainment button shown on display apparatus 26 (performs a third operation), the third request is inputted to information obtaining unit 2131. The third request includes an ID (Key) for identifying a target component. As information obtaining unit 2131 obtains the third request, it outputs the third request to record hash creation unit 2132.

Record hash creation unit 2132 identifies the ID of the target component from the third request and identifies a distributed ledger for which the time stamp token is to be obtained (the record hash value is to be created) For example, when the third request includes "k2" which is the ID of the second component, record hash creation unit 2132 creates the record hash value of the latest record (terminal record) in distributed ledger 52. Record hash creation unit 2132 outputs the created record hash value to time stamp token obtaining unit 2133.

Time stamp token obtaining unit 2133 outputs to communication apparatus 24, a control signal for transmitting the record hash value received from record hash creation unit 2132 to time stamp authority 8. The record hash value is thus transmitted to time stamp authority 8 through communication apparatus 24.

Time stamp authority 8 that has received the record hash value sends the time stamp token back to client server 2.

Time stamp token obtaining unit 2133 receives the time stamp token from time stamp authority 8 through communication apparatus 24. Time stamp token obtaining unit 2133 outputs the obtained time stamp token to output unit 2134.

Output unit 2134 has the time stamp token received from time stamp token obtaining unit 2133 stored in storage device 27. Alternatively, output unit 2134 may have the time stamp token received from time stamp token obtaining unit 2133 stored in database 4. Proof of time of existence can thus be obtained.

Output unit 2134 may have the time stamp token received from time stamp token obtaining unit 2133 held in distributed ledger set 50. For example, when output unit 2134 obtains the time stamp token for the record hash value in distributed ledger 52, it creates a record including the time stamp token and adds the record to distributed ledger 52. Then, output unit 2134 generates transaction data in which the time stamp token is set as Obj-HV, and outputs to communication apparatus 24, a control signal for transmitting the transaction data to client server 2 that participates in network NW. The time stamp token is thus added to distributed ledger set 50 in each client server 2.

Output unit 2134 may output to communication apparatus 24, a control signal for transmitting the time stamp token received from time stamp token obtaining unit 2133 to an external server 9. External server 9 is a server managed by a management entity which is none of the A company, the B company, the C company, and the D company. In order to tamper the time stamp token, the time stamp token managed in external server 9 should also be tampered. Management of the time stamp token also in external server 9 can enhance tamper resistance of the time stamp token.

<Flowchart>

Figure 9:
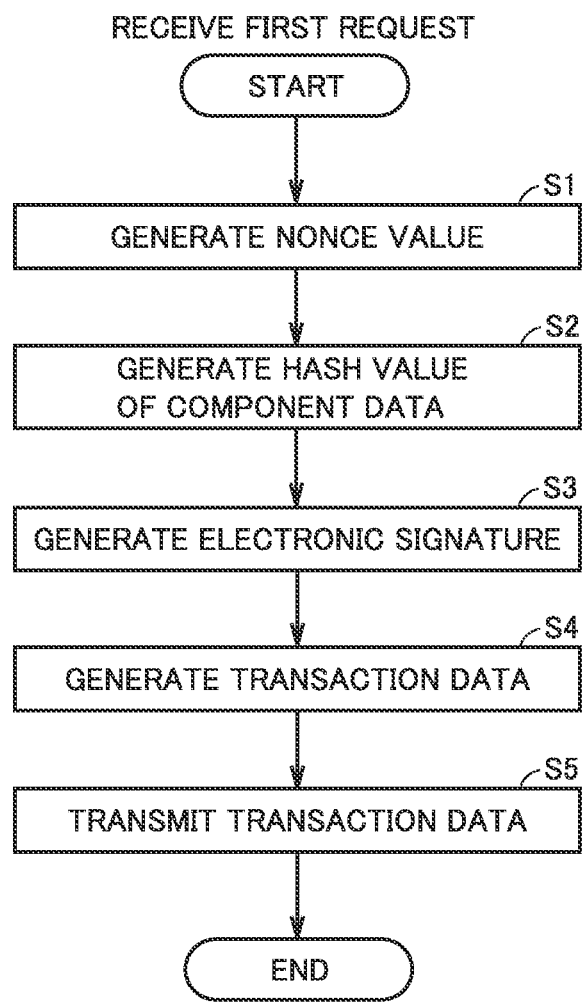
FIG. 9 is a flowchart showing a procedure in processing for generating transaction data at the time when a first request is received.

FIG. 9 is a flowchart showing a procedure in processing for generating transaction data at the time when the first request is received. Processing in the flowchart shown in FIG. 9 is performed by controller 21 when it receives the first request from input apparatus 25 or user terminal apparatus 7. Though an example in which each step (the step being abbreviated as "S" below) in the flowchart shown in FIG. 9 and FIGS. 10, 11, and 12 which will be described later is performed by software processing by controller 21 is described, a part or the entirety thereof may be performed by hardware (electronic circuitry) provided in controller 21.

In S1, controller 21 generates a nonce value. The nonce value is used as a number of transaction data.

In S2, controller 21 reads component data of a target component from database 4 and generates a hash value of the component data.

In S3, controller 21 reads secret key 271 from storage device 27 and creates an electronic signature by encrypting with secret key 271, the hash value generated in S2. Controller 21 may create the electronic signature by encrypting with secret key 271, the nonce value generated in S1. Alternatively, controller 21 may create the electronic signature by encrypting with secret key 271, the hash value generated in S2 and the nonce value generated in SL.

In S4, controller 21 generates transaction data including such information as Key, Age, Obj-HV, Nonce, Sig, Prev-HV, and HV. Specifically, controller 21 sets the ID of the target component included in the first request as Key. Controller 21 sets the nonce value generated in S1 as Nonce, sets the hash value generated in S2 as Obj-HV, and sets the electronic signature created in S3 as Sig. Controller 21 recognizes Age of the parent record by checking Key against distributed ledger set 50 and sets incremented Age of the parent record as Age. Controller 21 sets the record hash of the parent record as Prev-HV. Controller 21 hashes such information as Key, Age, Obj-HV, Nonce, Sig, and Prev-HV except for HV information and sets the information as HV. Controller 21 may have time information on time at which the transaction data is broadcast toward network NW and/or sender information on the sender of the transaction data included in the transaction data.

In S5, controller 21 outputs to communication apparatus 24, a control signal for transmitting the transaction data generated in S4 to network NW The transaction data is thus transmitted to network NW through communication apparatus 24.

Figure 10:
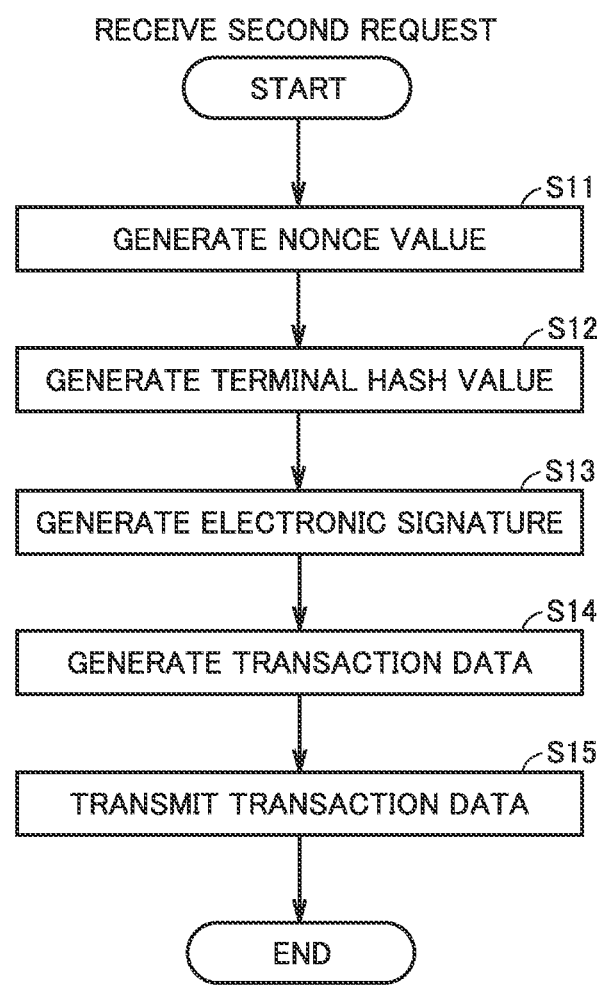
FIG. 10 is a flowchart showing a procedure in processing for generating transaction data at the time when a second request is received.

FIG. 10 is a flowchart showing a procedure in processing for generating transaction data at the time when the second request is received Processing in the flowchart shown in FIG. 10 is performed by controller 21 when it receives the second request from input apparatus 25 or user terminal apparatus 7.

In S11, controller 21 generates a nonce value. The nonce value is used as a number of transaction data.

In S12, controller 21 creates a terminal hash value by hashing the latest record (the terminal record in the proof chain) in the distributed ledger. As described above, on the display screen for the second operation, the "creation target input field" for input of an ID of a target component for which the terminal hash value is to be created and the "incorporation target input field" for input of an ID of a target component into which the terminal hash value is to be incorporated are provided. For example, when k1 is inputted to the creation target input field and k2 is inputted to the incorporation target input field, controller 21 creates the terminal hash value by hashing the latest record in distributed ledger 51.

In S13, controller 21 reads secret key 271 from storage device 27 and creates the electronic signature by encrypting with secret key 271, the terminal hash value generated in S12. Controller 21 may create the electronic signature by encrypting with secret key 271, the nonce value generated in S11. Alternatively, controller 21 may create the electronic signature by encrypting with secret key 271, the terminal hash value generated in S12 and the nonce value generated in S11.

In S14, controller 21 generates transaction data including such information as Key, Age, Obj-HV, Nonce, Sig, Prev-HV, and HV. Controller 21 sets the ID (k2 in the example above) inputted to the "incorporation target input field" as Key.

Controller 21 sets the terminal hash value generated in S12 as Obj-HV. Since other processing in S14 is basically similar to the processing in S4 in FIG. 9, description will not be repeated.

In S15, controller 21 outputs to communication apparatus 24, a control signal for transmitting the transaction data generated in S14 to network NW. The transaction data is thus transmitted to network NW through communication apparatus 24.

Figure 11:
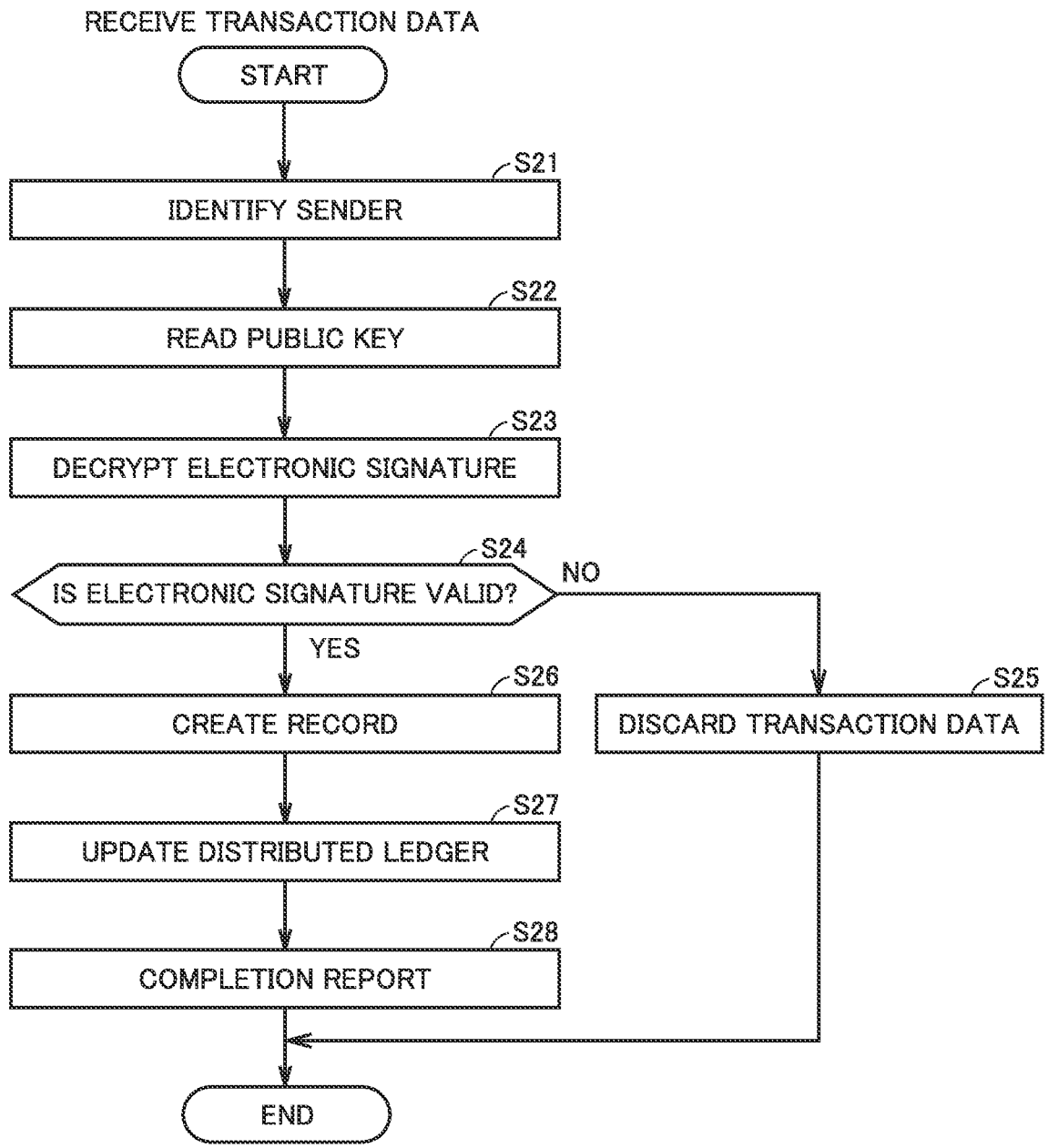
FIG. 11 is a flowchart showing a procedure in processing performed at the time when transaction data is received.

FIG. 11 is a flowchart showing a procedure in processing performed at the time when the transaction data is received. Processing in the flowchart shown in FIG. 11 is performed by controller 21 when it receives the transaction data.

In S21, controller 21 identifies based on sender information included in the received transaction data, client server 2 which is the sender of the transaction data.

In S22, controller 21 reads the public key of client server 2 identified in S21 from storage device 27.

In S23, controller 21 decrypts the electronic signature included in the transaction data with the public key read in S22.

In S24, controller 21 verifies validity of the electronic signature decrypted in S23. Specifically, controller 21 compares a value resulting from decryption of the electronic signature with the hash value (or the terminal hash value) included in the transaction data. When they do not match with each other, controller 21 does not acknowledge validity of the electronic signature (NO in S24) and has the process proceed to S25. When they match with each other, controller 21 acknowledges validity of the electronic signature (YES in S24) and has the process proceed to S26.

In S25, controller 21 discards the presently received transaction data and quits the process because the electronic signature is invalid. Controller 21 may have the possibility of tampering of the transaction data shown on display apparatus 26.

In S26, controller 21 reads such information as Key, Age, Obj-HV, Nonce, Sig, Prev-HV, and HV from the received transaction data and creates a record including the information.

In S27, controller 21 identifies based on Key in the record created in S26, a distributed ledger to which the record is to be added. Then, controller 21 adds the record to the identified distributed ledger. Distributed ledger set 50 is thus updated.

In S28, controller 21 transmits a notification (a completion report) indicating completion of transaction processing to client server 2 which is the sender of the transaction data.

Figure 12:
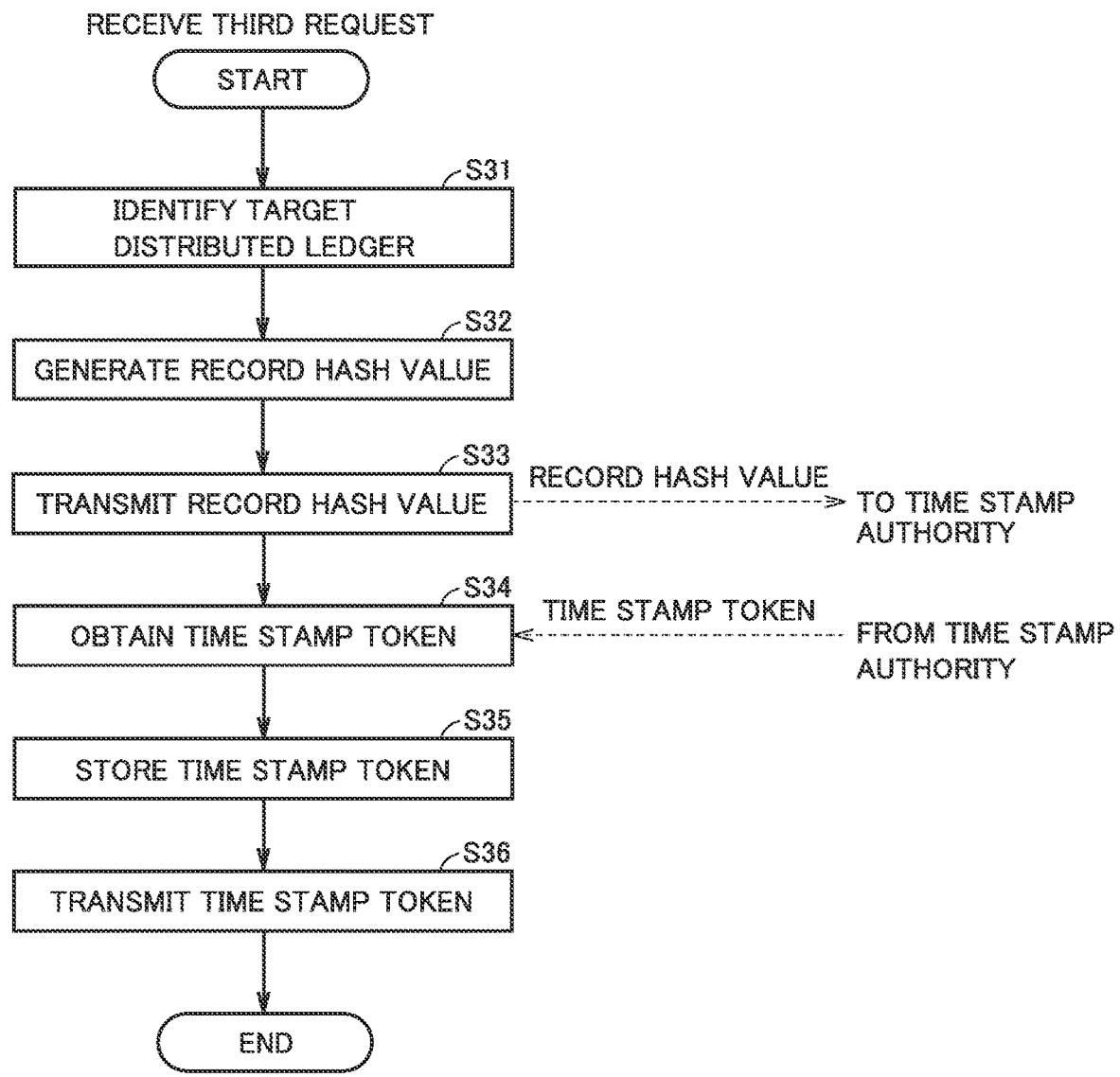
FIG. 12 is a flowchart showing a procedure in processing for obtaining a time stamp token.

FIG. 12 is a flowchart showing a procedure in processing for obtaining a time stamp token. Processing in the flowchart shown in FIG. 12 is performed by controller 21 when it receives the third request from input apparatus 25 or user terminal apparatus 7.

In S31, controller 21 identifies a distributed ledger (distributed ledger 51 or distributed ledger 52) for which the time stamp token is to be obtained, based on the ID of the target component included in the third request.

In S32, controller 21 generates the record hash value of the latest record (terminal record) in the distributed ledger identified in S31.

In S33, controller 21 outputs to communication apparatus 24, a control signal for transmitting the record hash value generated in S32 to time stamp authority 8. The record hash value is thus transmitted to time stamp authority 8 through communication apparatus 24.

In S34, controller 21 receives the time stamp token from time stamp authority 8 through communication apparatus 24. Proof of time of existence of the component data of the target component is thus obtained.

In S35, controller 21 has the time stamp token obtained in S34 stored in storage device 27. Controller 21 may have the time stamp token stored in database 4.

Furthermore, controller 21 may have the time stamp token held in distributed ledger set 50.

In S36, controller 21 outputs to communication apparatus 24, a control signal for transmitting the time stamp token obtained in S34 to external server 9. The time stamp token is thus transmitted to external server 9 through communication apparatus 24. Controller 21 may generate transaction data for adding the time stamp token to distributed ledger set 50 and output to communication apparatus 24, the control signal for transmitting the transaction data to network NW.

As set forth above, in data management system 1 according to the first embodiment, distributed ledger set 50 including two distributed ledgers 51 and 52 is held in client server 2. Distributed ledger 51 is the proof chain for proving existence of the component data of the first component and distributed ledger 52 is the proof chain for proving existence of the component data of the second component. Client server 2 performs a function to associate two distributed ledgers 51 and 52 with each other as requested by the user. Client server 2 has the terminal hash value in one distributed ledger incorporated into the record in the other distributed ledger. With the record into which the terminal hash value has been incorporated being defined as the reference, ordering of existence of the component data of the first component and the component data of the second component can be proven.

Client server 2 obtains the time stamp token for the record into which the terminal hash value has been incorporated. By obtaining the time stamp token for the record into which the terminal hash value has been incorporated, proof of time of existence of the component data of the first component and the component data of the second component (that is, proof of existence of the component data prior to the time indicated in the time stamp token) can be obtained. By obtaining the time stamp token for the record into which the terminal hash value has been incorporated, man-hours, cost, and load imposed on the system can be less than in an example where the time stamp token is obtained for each of distributed ledgers 51 and 52.

Client server 2 transmits the time stamp token to external server 9. Management of the time stamp token also in external server 9 can enhance tamper resistance of the time stamp token.

[First Modification]

Though an example in which two proof chains are associated with each other in response to the second request originating from the operation (second operation) by the user is described in the first embodiment, two proof chains may automatically be associated with each other. For example, each time component data of a target component is updated M (which is a natural number) times, the terminal hash value in the proof chain (distributed ledger) of the target component may be incorporated into the record in another proof chain (distributed ledger). Such a configuration can also achieve an effect the same as in the first embodiment.

Second Embodiment

An example in which platform server 5 performs a function to permit participation into network NW is described in the first embodiment. Then, finality of transaction data is given by confirmation of validity of the electronic signature between client servers 2 permitted to participate in network NW. In a second embodiment, an example in which a platform server 6 performs a function to give finality to transaction data in addition to the function to permit participation into network NW will be described.

Figure 13:
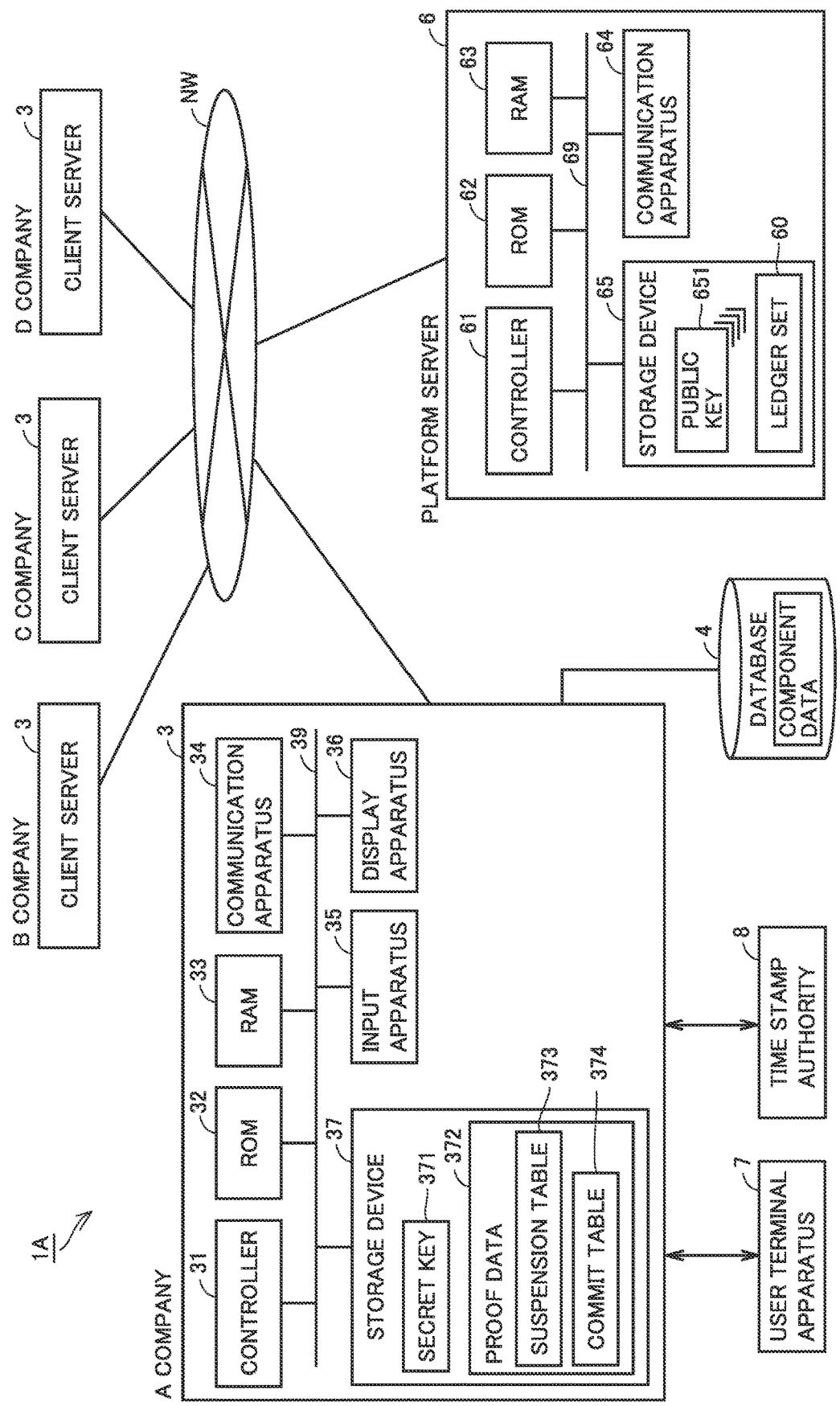
FIG. 13 is a diagram showing a schematic configuration of a data management system according to a second embodiment.

FIG. 13 is a diagram showing a schematic configuration of a data management system 1A according to the second embodiment. Data management system 1A includes four client servers 3, platform server 6, and time stamp authority 8. As in the first embodiment, four client servers 3 are servers belonging to different companies (for example, the A company, the B company, the C company, and the D company) Though client server 3 of the A company will representatively be described below, client servers 3 of the B company, the C company, and the D company are also similar in function.

Similarly to platform server 5 according to the first embodiment, platform server 6 manages network NW and accepts an application to participate in network NW from each client server 3. Platform server 6 permits participation of client server 3 into network NW based on an operation to permit participation by a manager of platform server 6 or based on a result of determination as to a prescribed condition. Participation of four client servers 3 belonging to the A company, the B company, the C company, and the D company into network NW is permitted also in the second embodiment.

Four client servers 3 and platform server 6 form network NW. Software based on the distributed ledger has been introduced in each of client servers 3, and as the introduced software based on the distributed ledger functions, each of client servers 3 functions as a node. Client server 3 is configured to communicate with user terminal apparatus 7 similarly to client server 2 according to the first embodiment.

Similarly to client server 2 according to the first embodiment, database 4 is connected to client server 3. Client server 3 (a controller 31) generates a control signal for storing/updating component data and outputs the control signal to database 4 in response to an input to an input apparatus 35 or a request from user terminal apparatus 7.

As client server 3 has component data stored in database 4/updates component data in database 4, it creates a hash value of the component data and generates transaction data for storing the hash value in a ledger held in platform server 6 and a distributed ledger held in each client server 3. Then, client server 3 transmits the generated transaction data to platform server 6.

Platform server 6 performs a function to give finality to the transaction data. A ledger set 60 is held in platform server 6, and platform server 6 processes transaction data received from client server 3 and updates ledger set 60. As platform server 6 updates ledger set 60, it transmits a summary (a proof record which will be described later) of a record added to the ledger by updating to all client servers 3 that participate in network NW. A commit table 374 where a commit record is stored is stored in client server 3. Commit table 374 corresponds to an exemplary "distributed ledger" according to the present disclosure.

FIG. 14 is a diagram showing an exemplary configuration of ledger set 60. Ledger set 60 includes a ledger 67 and a ledger 68. Similarly to distributed ledger 51 according to the first embodiment, a state of update of the component data of the first component is stored in a time-series manner in ledger 67, and ledger 67 forms a proof chain of the component data of the first component. Similarly to distributed ledger 52 according to the first embodiment, a state of update of the component data of the second component is stored in a time-series manner in ledger 68, and ledger 68 forms a proof chain of the component data of the second component. Since ledger set 60, ledger 67, and ledger 68 are similar in configuration to distributed ledger set 50, distributed ledger 51, and distributed ledger 52 according to the first embodiment, respectively, detailed description thereof will not be repeated.

Referring again to FIG. 13, client server 3 includes controller 31, a ROM 32, a RAM 33, a communication apparatus 34, input apparatus 35, a display apparatus 36, and a storage device 37. Controller 31, ROM 32, RAM 33, communication apparatus 34, input apparatus 35, display apparatus 36, and storage device 37 are connected to a bus 39. Since ROM 32, RAM 33, communication apparatus 34, input apparatus 35, and display apparatus 36 are basically similar in configuration to ROM 22, RAM 23, communication apparatus 24, input apparatus 25, and display apparatus 26 of client server 2 according to the first embodiment, description thereof will not be repeated.

A secret key 371 and proof data 372 are stored in storage device 37. Secret key 371 is a secret key of the A company. For example, in participation of client server 3 into network NW for the first time, controller 31 generates a secret key and a public key. Then, controller 31 transmits the generated public key to an authentication bureau (not shown) and has the public key authenticated. The authentication bureau issues an electronic certificate including information on the public key. Controller 31 has secret key 371 corresponding to the authenticated public key stored in storage device 37. Controller 31 transmits an authenticated public key (electronic certificate) 651 to platform server 6.

Figure 15:
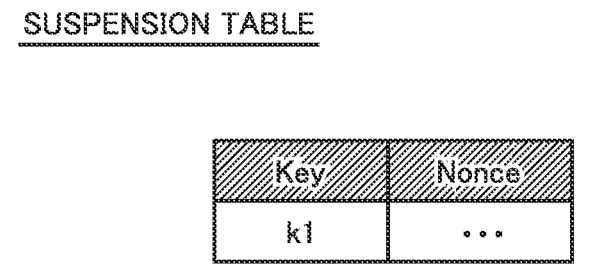

Proof data 372 includes a suspension table 373 and commit table 374. FIG. 15 is a diagram for illustrating an exemplary configuration of suspension table 373. FIG. 16 is a diagram for illustrating an exemplary configuration of commit table 374. Suspension table 373 and commit table 374 each includes a record for each target component.

Referring to FIG. 15, suspension table 373 includes a prescribed type of information included in transaction data that has not been used. Specifically, for example, a suspension record including such information as Key and Nonce is stored in suspension table 373. Of information included in the transaction data generated in response to the first request or the second request, controller 31 has such information as Key and Nonce stored as the suspension record in suspension table 373. The first request and the second request received by client server 3 from input apparatus 35 or user terminal apparatus 7 each include an ID of a target component. For example, when the first request relates to the first component, an ID indicating "k1" is included in the first request, and when the first request relates to the second component, an ID indicating "k2" is included in the first request. In other words, the ID of the target component included in the first request or the second request is set as Key. When controller 31 receives the first request or the second request, it generates a nonce value. The nonce value indicates a number of the first request or the second request (that is, a number of transaction data). Controller 31 creates the suspension record including such information as Key and Nonce and has the suspension record registered in suspension table 373. FIG. 15 shows an example in which the suspension record including Key set to k1 is registered in suspension table 373. When the first request and the second request are not particularly distinguished from each other, they will also collectively be referred to as an "update request" below.

When processing for responding to the update request is performed (that is, transaction data is used), controller 31 deletes the suspension record including Key information similar to Key included in the transaction data used for performing transaction processing from suspension table 373.

A suspension record including the same Key information is not redundantly registered in suspension table 373. In registration of the suspension record in suspension table 373, controller 31 determines whether or not a suspension record including Key that matches with Key included in the suspension record to be registered has already been registered in suspension table 373. When the suspension record including Key that matches with Key included in the suspension record to be registered has not been registered in suspension table 373, controller 31 has the suspension record registered in suspension table 373. When the suspension record including Key that matches with Key included in the suspension record to be registered has been registered in suspension table 373, controller 31 waits for deletion of the suspension record including matching Key from suspension table 373. In other words, in the example shown in FIG. 15, the suspension record including Key set to k2 can be registered in suspension table 373, whereas the suspension record including Key set to k1 cannot be registered Commit table 374 includes a prescribed type of information included in used transaction data. Specifically, a commit record including such information as Key, Age, HV, and Nonce is stored in commit table 374. Commit table 374 includes commit data 375 where a commit record including Key set to k1 is stored and commit data 376 where a commit record including Key set to k2 is stored.

As platform server 6 performs transaction processing to update the ledger in ledger set 60, it creates the proof record and transmits the proof record to all client servers 3 that participate in network NW. The proof record is, for example, a record including such information as Key, Age, HV, and Nonce among records added to the ledger by transaction processing performed with the use of the transaction data.

As controller 31 receives the proof record, it adds the proof record to commit table 374 (commit data 375 or commit data 376) as the commit record. Then, controller 31 deletes the suspension record including Key similar to Key included in the added commit record from suspension table 373.

Platform server 6 includes a controller 61, a ROM 62, a RAM 63, a communication apparatus 64, and a storage device 65. Controller 61, ROM 62, RAM 63, communication apparatus 64, and storage device 65 are connected to a bus 69.

Controller 61 is implemented by an integrated circuit including a CPU. Controller 61 develops various programs stored in ROM 62 on RAM 63 and executes the programs. The various programs include an operating system and the like. RAM 63 functions as a working memory, and various types of data necessary for execution of various programs are temporarily stored therein. Controller 61 receives transaction data from client server 3 and performs transaction processing.

Communication apparatus 64 is configured to communicate with client server 3 that participates in network NW.

A plurality of public keys 651 and ledger set 60 are stored in storage device 65. The plurality of public keys 651 include public keys of companies that manage client servers 3 that participate in network NW. Specifically, the plurality of public keys 651 include the public key of the A company, the public key of the B company, the public key of the C company, and the public key of the D company.

Since ledger set 60 is similar in configuration to distributed ledger set 50 according to the first embodiment as described above, description will not be repeated.

Processing for responding to the first request, the second request, and the third request in the second embodiment will sequentially be described below with reference to a flowchart.

Figure 17:
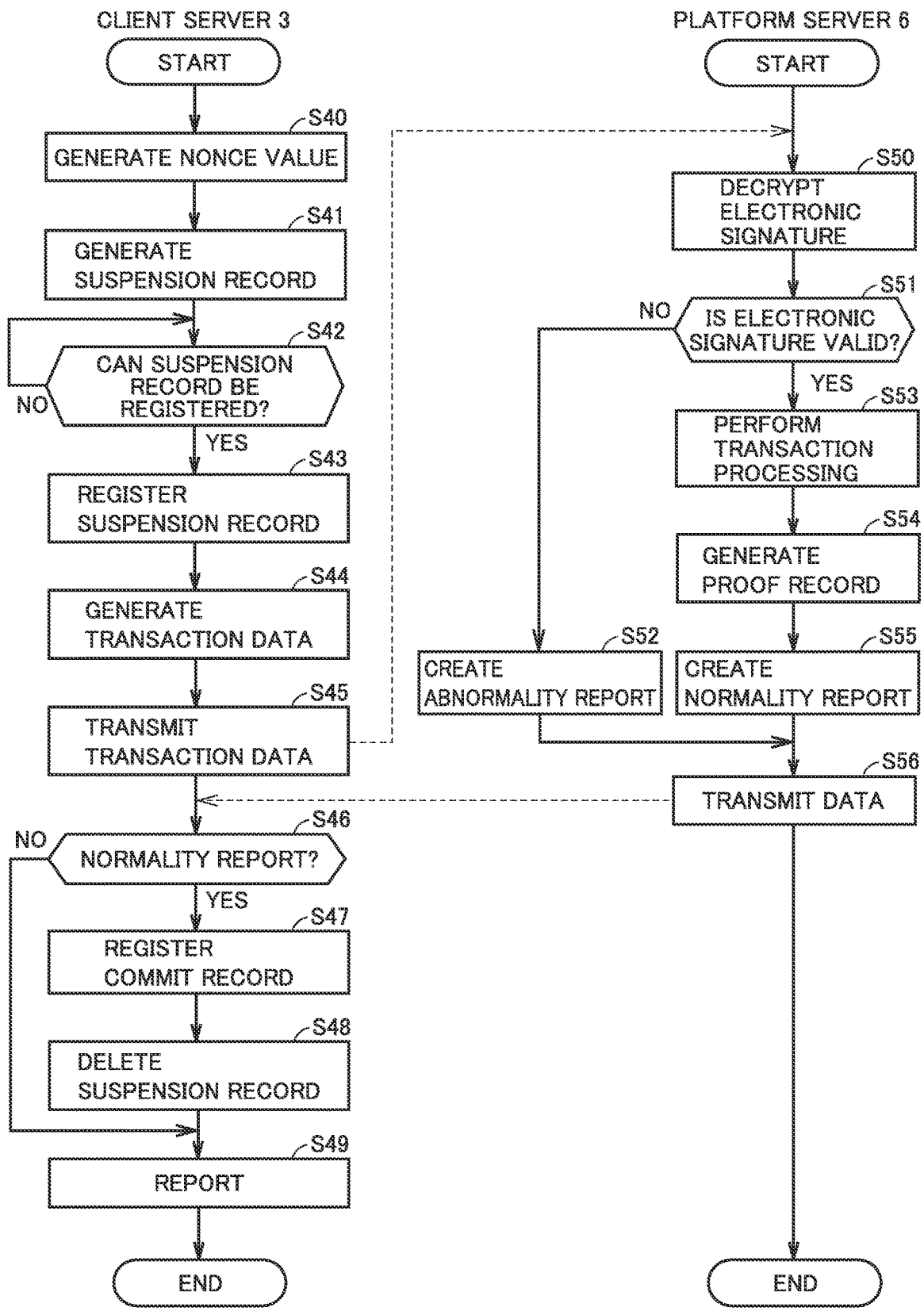
FIG. 17 is a flowchart showing a procedure in processing performed in the data management system at the time when an update request (a first request or a second request) is received.

FIG. 17 is a flowchart showing a procedure in processing performed in data management system 1A at the time when the update request (the first request or the second request) is received. Processing in the flowchart shown in FIG. 17 is started by controller 31 of client server 3 when it receives the update request (the first request or the second request) from input apparatus 25 or user terminal apparatus 7.

In S40, controller 31 of client server 3 generates a nonce value. The nonce value is used as a number of transaction data generated in response to the update request.

In S41, controller 31 of client server 3 generates a suspension record. Specifically, controller 31 of client server 3 reads an ID of a target component included in the update request, and generates the suspension record with the ID being set as Key information and with the nonce value generated in S40 being set as Nonce information.

In S42, controller 31 of client server 3 determines whether or not the suspension record generated in S41 can be registered in suspension table 373. When a suspension record including Key information similar to that in the suspension record generated in S41 has been registered in suspension table 373, controller 31 of client server 3 makes negative determination (NO in S42) and waits for deletion of the suspension record including similar Key information from suspension table 373. When a suspension record including Key information similar to that in the suspension record generated in S41 has not been registered in suspension table 373, controller 31 of client server 3 makes affirmative determination (YES in S42) and has the process proceed to S43.

In S43, controller 31 of client server 3 has the suspension record registered in suspension table 373.

In S44, controller 31 of client server 3 generates transaction data for responding to the update request. Specifically, when the update request falls under the first request, controller 31 of client server 3 performs processing similar to the processing in S2 to S5 described with reference to FIG. 9 to generate transaction data, and when the update request falls under the second request, it performs processing similar to the processing in S12 to S15 described with reference to FIG. 10 to generate transaction data. Since details of the processing are as described with reference to FIGS. 9 and 10, description will not be repeated.

In S45, controller 31 of client server 3 outputs to communication apparatus 34, a control signal for transmitting the transaction data generated in S44 to platform server 6. The transaction data is thus transmitted to platform server 6 through communication apparatus 34.

In S50, controller 61 of platform server 6 decrypts the electronic signature for verifying validity of the electronic signature included in the received transaction data. Specifically, controller 61 of platform server 6 performs processing similar to the processing in S21 to S23 described with reference to FIG. 11 to decrypt the electronic signature. Since details of the processing are as described with reference to FIG. 11, description will not be repeated.

In S51, controller 61 of platform server 6 verifies validity of the electronic signature decrypted in S50. Specifically, controller 61 of platform server 6 compares the value obtained by decryption of the electronic signature with the hash value included in the transaction data (in the transaction data generated in response to the first request, the hash value of the component data of the target component, and in the transaction data generated in response to the second request, the terminal hash value). When they do not match with each other, controller 61 of platform server 6 does not acknowledge validity of the electronic signature (NO in S51) and has the process proceed to S52. When they match with each other, controller 61 of platform server 6 acknowledges validity of the electronic signature (YES in S51) and has the process proceed to S53.

In S52, controller 61 of platform server 6 determines that the transaction data received from client server 3 may have been tampered, and discards the transaction data and creates an abnormality report indicating possibility of tampering. Then, controller 61 of platform server 6 has the process proceed to S56.

In S53, controller 61 of platform server 6 performs transaction processing. Specifically, controller 61 of platform server 6 performs processing similar to the processing in S26 and S27 described with reference to FIG. 11 to generate a record in the ledger identified by Key information included in the transaction data, to add the generated record to the ledger, and to update ledger set 60.

In S54, controller 61 of platform server 6 generates a proof record. The proof record includes such information as Key, Age, HV, and Nonce in the information included in the record added to the ledger.

In S55, controller 61 of platform server 6 creates a normality report indicating completion of update of ledger set 60 (that is, processing of the transaction data). Controller 61 of platform server 6 has the proof record included in the normality report.

In S56, controller 61 of platform server 6 outputs to communication apparatus 64, a control signal for transmitting the abnormality report created in S52 or the normality report created in S55 to client server 3. The abnormality report or the normality report is thus transmitted to client server 3 through communication apparatus 64.

In S56, controller 61 of platform server 6 outputs to communication apparatus 64, a control signal for transmitting the proof record to client servers 3 (for example, client servers 3 of the B company, the C company, and the D company) other than the sender of the transaction data. The proof record is thus transmitted to other client servers 3 through communication apparatus 64.

In S46, controller 31 of client server 3 determines whether or not it has received the normality report from platform server 6. When controller 31 of client server 3 determines that it has received the normality report (YES in S46), it has the process proceed to S47 When controller 31 of client server 3 determines that it has not received the normality report, that is, it has received the abnormality report (NO in S46), it has the process proceed to S49.

In S47, controller 31 of client server 3 adds the proof record included in the normality report to committable 374 as the commit record. Specifically, controller 31 of client server 3 determines whether the commit record is to be added to commit data 375 or commit data 376 based on Key information in the proof record. Then, controller 31 of client server 3 adds the commit record to the target commit data.

In S48, controller 31 of client server 3 deletes the suspension record including the Key information the same as that in the added commit record from suspension table 373.

In S49, controller 31 of client server 3, for example, has a result of processing for the update request shown on display apparatus 36 or transmits the result to user terminal apparatus 7.

As other client servers 3 (client servers 3 of the B company, the C company, and the D company) that have received the proof record transmitted in S56 similarly also add the proof record to respective commit tables 374, commit tables 374 are updated.

FIG. 18 is a flowchart showing a procedure in processing for obtaining a time stamp token in the second embodiment. Processing in the flowchart shown in FIG. 18 is performed by controller 31 when it receives the third request from input apparatus 35 or user terminal apparatus 7.

In S61, controller 31 identifies commit data (commit data 375 or commit data 376) for which the time stamp token is to be obtained, based on the ID of the target component included in the third request.

In S62, controller 31 generates the hash value of the latest commit record of the commit data identified in S61.

In S63, controller 31 outputs to communication apparatus 34, a control signal for transmitting the hash value generated in S62 to time stamp authority 8. The hash value is thus transmitted to time stamp authority 8 through communication apparatus 34.

In S64, controller 31 receives the time stamp token from time stamp authority 8 through communication apparatus 34. Proof of time of existence of the component data of the target component is thus obtained.

In S65, controller 31 has the time stamp token obtained in S64 stored in storage device 37. Controller 31 may have the time stamp token stored in database 4.

In S66, controller 21 outputs to communication apparatus 34, a control signal for transmitting the time stamp token obtained in S34 to external server 9. The time stamp token is thus transmitted to external server 9 through communication apparatus 34. Furthermore, in order to add the time stamp token to commit table 374, controller 31 may generate transaction data for including the time stamp token in ledger set 60 and output to communication apparatus 34, a control signal for transmitting the transaction data to platform server 6.

As set forth above, in data management system 1A according to the second embodiment, platform server 6 gives finality to the transaction data. Ledger set 60 including two ledgers 67 and 68 is held in platform server 6. The state of update of the component data of the first component is stored in the time-series manner in ledger 67, and the state of update of the component data of the second component is stored in the time-series manner in ledger 68. Then, as ledger set 60 is updated, the proof record which is the summary of the record added to ledger set 60 is sent from platform server 6 to each client server 3, and each of client servers 3 adds the proof record to commit table 374 as the commit record Commit table 374 corresponds to distributed ledger set 50 according to the first embodiment. In the configuration of data management system 1A according to the second embodiment as well, by incorporating the terminal hash value in one ledger (for example, ledger 67) into the record in the other ledger (for example, ledger 68) to associate them with each other, commit data which is the summary thereof will also be associated with each other. Thus, as in the first embodiment, with the commit record into which the terminal hash value has been incorporated being defined as the reference, ordering of existence of the component data of the first component and the component data of the second component can be proven.

As client servers 3 hold their commit tables 374 between each other, tamper resistance of commit table 374 is enhanced.

Client server 3 obtains the time stamp token for the record of the commit data into which the terminal hash value has been incorporated. By obtaining the time stamp token for the record into which the terminal hash value has been incorporated, proof of time of existence of the component data of the first component and the component data of the second component (that is, proof of existence of the component data prior to time indicated by the time stamp token)) can be obtained.

In addition, client server 3 transmits the time stamp token to external server 9. Management of the time stamp token also in external server 9 can enhance tamper resistance of the time stamp token.

[Second Modification]

An example in which commit table 374 includes some of information included in ledger set 60 is described in the second embodiment. Specifically, each of pieces of commit data 375 and 376 in commit table 374 includes such information as Key, Age, H V, and Nonce, of such information as Key, Age, Obj-HV, Nonce, Sig, Prev-HV, and HV in each of ledgers 67 and 68 in ledger set 60. Each of pieces of commit data 375 and 376, however, may include information the same as that in ledgers 67 and 68, that is, such information as Key, Age, Obj-HV, Nonce, Sig, Prev-HV, and HV. In this case, the proof record will also be generated to include such information as Key, Age, Obj-HV, Nonce, Sig, Prev-HV, and HV. According to the configuration as above as well, an effect the same as in the second embodiment can be achieved.

Though embodiments of the present disclosure have been described above, it should be understood that the embodiments disclosed herein are illustrative and non-restrictive in every respect. The technical scope of the present disclosure is defined by the terms of the claims and is intended to include any modifications within the scope and meaning equivalent to the terms of the claims.

What is claimed is:

1. A data management apparatus that manages data based on a distributed ledger technology, the data management apparatus comprising:
    a storage device where a distributed ledger is stored, in the distributed ledger, a record including information on the data is stored in a time-series manner; and
    a controller that adds the record to the distributed ledger, wherein
    the data includes first data and second data,
    the distributed ledger includes a first distributed ledger where a record including first information on the first data is stored in a time-series manner and a second distributed ledger where a record including second information on the second data is stored in a time-series manner,
    the controller is configured to update the first data in the first distributed ledger and the second data in the second distributed ledger independently from each other,
    when the first data is updated at a first time point, the controller
        causes the record including the first information to be stored in the first distributed ledger and generates a first terminal value including information on the record, and
        causes a record including the first terminal value to be stored in the second distributed ledger.

2. The data management apparatus according to claim 1, wherein
    the first terminal value is a hash value of the record stored in the first distributed ledger at the first time point.

3. The data management apparatus according to claim 1, wherein
    the first information is a hash value of the first data, and the second information is a hash value of the second data.

4. The data management apparatus according to claim 1, wherein
    the controller causes the record including the first terminal value to be stored in the second distributed ledger based on a request from a user.

5. The data management apparatus according to claim 1, further comprising a communication apparatus configured to communicate with a time stamp authority, wherein
    at a second time point which is a time point later than the first time point, the controller transmits a second terminal value including information on a record at a terminal in the second distributed ledger through the communication apparatus to the time stamp authority and obtains a time stamp token for the second terminal value from the time stamp authority through the communication apparatus.

6. The data management apparatus according to claim 5, wherein
    the controller obtains the time stamp token based on a request from a user.

7. A data management method performed by a data management apparatus that manages data based on a distributed ledger technology, the data management apparatus including
    a storage device where a distributed ledger is stored, in the distributed ledger, a record including information on the data is stored in a time-series manner, and
    a controller that adds the record to the distributed ledger, the data including first data and second data,
    the distributed ledger including a first distributed ledger where a record including first information on the first data is stored in a time-series manner and a second distributed ledger where a record including second information on the second data is stored in a time-series manner, the data management method comprising:
    updating, by the controller, the first data in the first distributed ledger and the second data in the second distributed ledger,
    the updating including updating under control by the controller, the first data in the first distributed ledger and the second data in the second distributed ledger independently from each other,
    the updating further including when the first data is updated at a prescribed time point, under control by the controller,
    storing the record including the first information in the first distributed ledger and generating a first terminal value including information on the record; and
    storing a record including the first terminal value in the second distributed ledger.

* * * * *